US009826346B2

(12) United States Patent
Mae et al.

(10) Patent No.: US 9,826,346 B2
(45) Date of Patent: Nov. 21, 2017

(54) NON-TRANSITORY RECORDING MEDIUM ENCODED WITH COMPUTER READABLE INFORMATION PROCESSING PROGRAM, INFORMATION PROCESSING APPARATUS, INFORMATION PROCESSING METHOD, AND INFORMATION PROCESSING SYSTEM, CAPABLE OF ENHANCING ZEST OF WIRELESS COMMUNICATION

(71) Applicant: NINTENDO CO., LTD., Kyoto-shi, Kyoto (JP)

(72) Inventors: Kenichi Mae, Kyoto (JP); Masaru Shimomura, Kyoto (JP); Yoshihisa Kondo, Kyoto (JP); Hiroyuki Takeuchi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 3 days.

(21) Appl. No.: 14/081,920

(22) Filed: Nov. 15, 2013

(65) Prior Publication Data

US 2015/0072703 A1    Mar. 12, 2015

(30) Foreign Application Priority Data

Sep. 6, 2013   (JP) ................................. 2013-185042

(51) Int. Cl.
*H04W 24/00*   (2009.01)
*H04W 4/02*   (2009.01)
(Continued)

(52) U.S. Cl.
CPC .............. *H04W 4/02* (2013.01); *H04L 67/08* (2013.01); *H04W 4/028* (2013.01); *H04W 4/206* (2013.01)

(58) Field of Classification Search
CPC ........... H04W 4/02; H04W 8/20; H04W 8/22; H04W 28/0226; H04W 4/12;
(Continued)

(56) References Cited

U.S. PATENT DOCUMENTS 8,634,848 B1 * 1/2014 Bozarth ................ H04W 64/00
455/41.2
2002/0061743 A1 * 5/2002 Hutcheson .............. A63F 13/12
455/419

(Continued)

FOREIGN PATENT DOCUMENTS

JP    2002-165258    6/2002
JP    2003-210831    7/2003

(Continued)

*Primary Examiner* — Kwasi Karikari
(74) *Attorney, Agent, or Firm* — Nixon & Vanderhye, P.C.

(57) ABSTRACT

A non-transitory storage medium encoded with a computer readable information processing program executable by a computer of an information processing apparatus having a wireless communication function. The information processing program causes the computer to function as position data obtaining means for obtaining position data indicating a position of the information processing apparatus, data transmission and reception means for transmitting the position data obtained by the position data obtaining means to another information processing apparatus within coverage through wireless communication and receiving position data obtained by position data obtaining means of another information processing apparatus through wireless communication, and processing performing means for performing predetermined information processing based on the position data received from another information processing apparatus through the data transmission and reception means.

22 Claims, 33 Drawing Sheets

(51) Int. Cl.
*H04L 29/08* (2006.01)
*H04W 4/20* (2009.01)

(58) Field of Classification Search
CPC ......... H04W 52/0251; H04W 52/0258; H04W 88/06; H04W 40/20; H04W 40/248; H04W 4/021; H04W 4/028; H04W 4/04; H04W 4/14; H04W 76/045
See application file for complete search history.

(56) References Cited

U.S. PATENT DOCUMENTS

| | | |
|---|---|---|
| 2004/0259642 A1 | 12/2004 | Tanaka et al. |
| 2007/0054739 A1* | 3/2007 | Amaitis et al. ................ 463/42 |
| 2009/0011834 A1* | 1/2009 | Chhabra ........................ 463/42 |
| 2009/0047982 A1* | 2/2009 | Shi ......................... H04W 4/02 455/466 |
| 2012/0157129 A1* | 6/2012 | Kuwahara ............... A63F 13/12 455/457 |
| 2012/0164946 A1 | 6/2012 | Fujiwara et al. |
| 2014/0018156 A1* | 1/2014 | Rizzotti ................. A63F 13/12 463/25 |

FOREIGN PATENT DOCUMENTS

| | | |
|---|---|---|
| JP | 2005-028103 | 2/2005 |
| JP | 2005-319135 | 11/2005 |
| JP | 2006-295388 | 10/2006 |
| JP | 2009-134524 | 6/2009 |
| JP | 2012-139362 | 7/2012 |

\* cited by examiner

FIG.5

| COMMUNICATION REGION DATA ||
|---|---|
| REGION | THE NUMBER OF TIMES OF PASSING |
| OSAKA | 100 TIMES |
| TOKYO | 50 TIMES |
| ⋮ | ⋮ |

FIG.23

| FRIEND REGISTRATION LIST | |
|---|---|
| DEVICE B | ○ |
| DEVICE C | ○ |
| ⋮ | ⋮ |

FIG.26

| POSITION HISTORY DATA ||
|---|---|
| TIME | POSITION |
| ○:○○ | POSITION P |
| ○:○○ | POSITION Q |
| ○:○○ | POSITION R |
| ⋮ | ⋮ |

NON-TRANSITORY RECORDING MEDIUM ENCODED WITH COMPUTER READABLE INFORMATION PROCESSING PROGRAM, INFORMATION PROCESSING APPARATUS, INFORMATION PROCESSING METHOD, AND INFORMATION PROCESSING SYSTEM, CAPABLE OF ENHANCING ZEST OF WIRELESS COMMUNICATION

This nonprovisional application is based on Japanese Patent Application No. 2013-185042 filed with the Japan Patent Office on Sep. 6, 2013, the entire contents of which are hereby incorporated by reference.

FIELD

The present disclosure relates to information processing by an information processing apparatus, and to control of communication between/among information processing apparatuses and execution of predetermined processing based on a result of that communication.

BACKGROUND AND SUMMARY

A system capable of providing data which can be made use of in an application to another information processing apparatus through wireless communication has conventionally been known.

For example, in the system above, data which can be made use of in an application is exchanged between/among information processing apparatuses from a communication counterpart through wireless communication, so that the data can be made use of in each information processing apparatus. If other data can be made use of however, zest of wireless communication can further be enhanced by information processing making use of the data.

An object of the present disclosure is to solve the problem as described above, and to provide a non-transitory storage medium encoded with a computer readable information processing program, an information processing apparatus, an information processing method, and an information processing system, capable of enhancing zest of wireless communication.

An exemplary embodiment provides a non-transitory storage medium encoded with a computer readable information processing program executable by a computer of an information processing apparatus having a wireless communication function. The information processing program causes the computer to function as a position data obtaining module for obtaining position data indicating a position of the information processing apparatus, a data transmission and reception module for transmitting the position data obtained by the position data obtaining module to another information processing apparatus within coverage through wireless communication and receiving position data obtained by position data obtaining module of another information processing apparatus through the wireless communication, and a processing performing module for performing predetermined information processing based on the position data received from another information processing apparatus through the data transmission and reception module.

In the exemplary embodiment, the processing performing module may perform the predetermined information processing based on the position data received from another information processing apparatus and the position data indicating the position of the information processing apparatus.

In the exemplary embodiment, the processing performing module may perform the predetermined information processing based on the position data received from another information processing apparatus and the position data indicating the position of the information processing apparatus obtained by the position data obtaining module when the position data has been received or when the information processing is performed.

In the exemplary embodiment, the processing performing module may perform the predetermined information processing based on relative positional relation between a position of another information processing apparatus and the position of the information processing apparatus, which is based on the position data received from another information processing apparatus and the position data indicating the position of the information processing apparatus.

In the exemplary embodiment, the processing performing module may perform the predetermined information processing based on at least one of a distance and a direction obtained from the position data indicating the position of the information processing apparatus and the position data received from another information processing apparatus.

In the exemplary embodiment, the position data obtaining module may repeatedly obtain position data indicating a position of the information processing apparatus, and the data transmission and reception module may transmit through wireless communication, the position data repeatedly obtained by the position data obtaining module to another information processing apparatus within coverage and receive through the wireless communication, position data repeatedly obtained by the position data obtaining module of another information processing apparatus.

In the exemplary embodiment, the processing performing module may repeatedly perform the predetermined information processing based on the position data repeatedly received from another information processing apparatus through the data transmission and reception module.

In the exemplary embodiment, the processing performing module may perform the predetermined information processing based on change in the position data received from another information processing apparatus through the data transmission and reception module.

In the exemplary embodiment, the processing performing module may perform the predetermined information processing based on a trace of the position data received from another information processing apparatus through the data transmission and reception module.

In the exemplary embodiment, the data transmission and reception module may transmit through wireless communication, data which can be made use of in information processing in another information processing apparatus and the position data obtained by the position data obtaining module to another information processing apparatus within coverage and receive through the wireless communication from another information processing apparatus, data which can be made use of in information processing by the information processing apparatus and the position data obtained by the position data obtaining module of another information processing apparatus, and the processing performing module may perform the predetermined information processing based on the data which can be made use of and the position data received from another information processing apparatus.

In the exemplary embodiment, the processing performing module may perform the predetermined information processing based on data of the information processing apparatus as well as on the data which can be made use of and the position data received from another information processing apparatus.

In the exemplary embodiment, the data transmission and reception module may transmit through wireless communication, the position data obtained by the position data obtaining module to a plurality of other information processing apparatuses within coverage and receive position data obtained by a position data obtaining module of the plurality of other information processing apparatuses through the wireless communication, and the processing performing module may perform the predetermined information processing based on the position data received from the plurality of other information processing apparatuses.

In the exemplary embodiment, the processing performing module may perform the predetermined information processing based on input data indicating input from a user to an input module of the information processing apparatus and the position data received from another information processing apparatus through the data transmission and reception module.

In the exemplary embodiment, the processing performing module may exchange input data which can be made use of with another information processing apparatus through the data transmission and reception module, based on the position data received from another information processing apparatus through the data transmission and reception module.

In the exemplary embodiment, a search module for repeatedly searching for another unspecified information processing apparatus within the coverage and automatically establishing wireless connection is further provided, and the data transmission and reception module may automatically transmit through wireless communication, the position data to another information processing apparatus with which wireless connection has been established and automatically receive through the wireless communication, the position data obtained by the position data obtaining module of another information processing apparatus.

An exemplary embodiment provides a method of controlling an information processing apparatus having a wireless communication function, including the steps of obtaining position data indicating a position of the information processing apparatus, transmitting the obtained position data to another information processing apparatus within coverage through wireless communication, receiving position data indicating a position of another information processing apparatus from another information processing apparatus through the wireless communication, and performing predetermined information processing based on the position data received from another information processing apparatus.

An exemplary embodiment provides an information processing apparatus including a position data obtaining unit for obtaining position data indicating a position of the information processing apparatus, a data transmission and reception unit for transmitting the position data obtained by the position data obtaining unit to another information processing apparatus within coverage through wireless communication and receiving position data obtained by a position data obtaining unit of another information processing apparatus through the wireless communication, and a processing performing unit for performing predetermined information processing based on the position data received from another information processing apparatus through the data transmission and reception unit.

An exemplary embodiment provides an information processing system including a position data obtaining unit for obtaining position data indicating a position of an information processing apparatus, a data transmission and reception unit for transmitting the position data obtained by the position data obtaining unit to another information processing apparatus within coverage through wireless communication and receiving position data obtained by a position data obtaining unit of another information processing apparatus through the wireless communication, and a processing performing unit for performing predetermined information processing based on the position data received from another information processing apparatus through the data transmission and reception unit.

According to the exemplary embodiment, since an information processing apparatus can exchange position information with another information processing apparatus, zest of wireless communication can further be enhanced by information processing making use of the information.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 5 shows an exemplary illustrative non-limiting diagram illustrating an example of other display processing according to the first exemplary embodiment.

FIG. 23 shows an exemplary illustrative non-limiting diagram illustrating one example of a friend registration list stored in a data storage area according to the second exemplary embodiment.

FIG. 26 shows an exemplary illustrative non-limiting diagram illustrating position history data of received position data according to the second exemplary embodiment.

DETAILED DESCRIPTION OF NON-LIMITING EXAMPLE EMBODIMENTS

Figure 1:
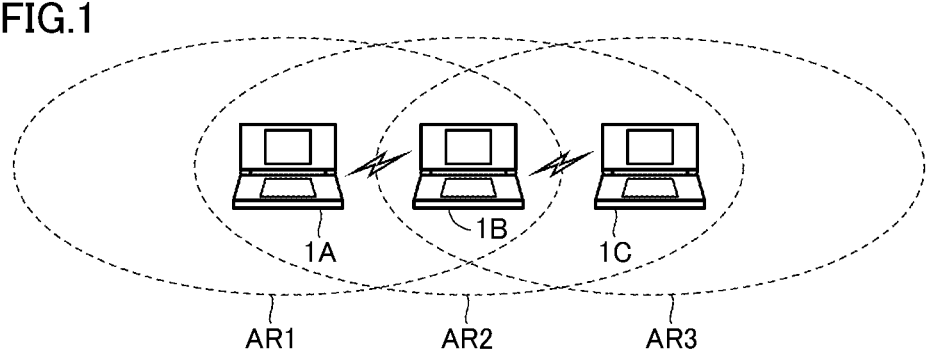
FIG. 1 shows an exemplary illustrative non-limiting diagram schematically showing a configuration of an information processing system according to an exemplary embodiment.

This embodiment will be described in detail with reference to the drawings. It is noted that the same or corresponding parts in the drawings have the same reference characters allotted and description thereof will not be repeated.

<Configuration of Information Processing System>

FIG. 1 is a diagram schematically showing a configuration of an information processing system based on one embodiment.

Referring to FIG. 1, an information processing system including information processing apparatuses 1A to 1C will be described hereinafter as one embodiment. Each of information processing apparatuses 1A to 1C has a wireless communication function and can communicate with one another. In the present example, coverage AR1 to AR3, in which information processing apparatuses 1A to 1C can communicate by making use of the wireless communication function, is shown. Wireless communication can be carried out between/among information processing apparatuses included in coverage. In the present example, a case that wireless communication can be carried out between information processing apparatus 1A and information processing apparatus 1B is shown. In addition, a case that wireless communication can be carried out between information processing apparatus 1B and information processing apparatus 1C is shown. It is noted that, if information processing apparatus 1A and information processing apparatus 1C are included in coverage AR3 and coverage AR1, wireless communication between information processing apparatus 1A and information processing apparatus 1C can also be carried out.

When characteristics common to the information processing apparatuses above are mentioned herein, they may also collectively be referred to as an "information processing apparatus 1." For an information processing apparatus belonging to the information processing system according to the present embodiment, a portable telephone, a smart phone (a high-function portable telephone), a television set incorporating an information processing function, a portable information processing apparatus, a stationary information processing apparatus, and the like can be adopted.

In the present example, a portable game device will be described by way of example of an information processing apparatus.

<Configuration of Game Device>

Figure 2:
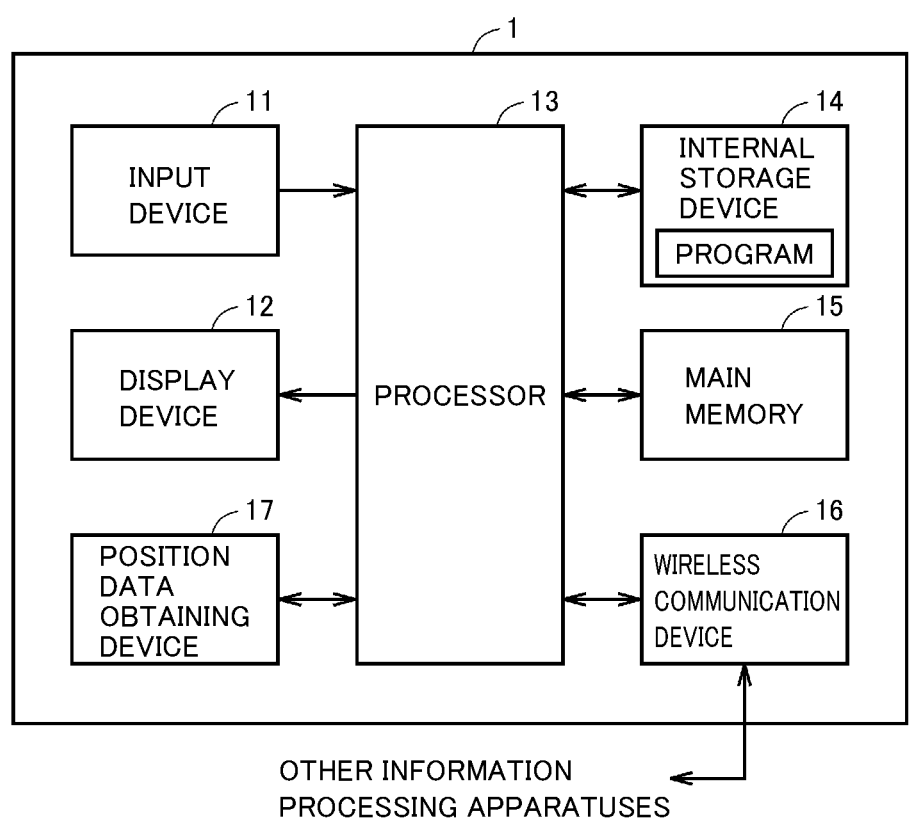
FIG. 2 shows an exemplary illustrative non-limiting schematic block diagram of a configuration of a game device 1 according to the exemplary embodiment.

FIG. 2 is a schematic block diagram of a configuration of a game device 1 based on the present embodiment. It is noted that, since the configuration is also the same in other game devices, detailed description thereof will not be provided.

Referring to FIG. 2, game device 1 includes an input device 11, a display device 12, a processor 13, an internal storage device 14, a main memory 15, a wireless communication device 16, and a position data obtaining device 17.

Input device 11 is operated by a user of game device 1 and outputs to processor 13, a signal in response to a user's operation. Input device 11 is implemented, for example, by a cross-shaped switch, a push button, or a touch panel.

Display device 12 displays on a screen, an image generated in game device 1. Display device 12 can include a liquid crystal display device (LCD) by way of example.

Processor 13 is operation processing means for executing a computer program.

Internal storage device 14 stores a computer program (simply also referred to as a program) to be executed by processor 13. Internal storage device 14 also stores data to be exchanged through communication, which will be described later. Internal storage device 14 is implemented, by way of example, by a NAND-type flash memory. A computer program to be executed by processor 13 may be recorded in advance or may be obtained from another device through communication with another device.

Main memory 15 temporarily stores a computer program or information. Main memory 15 is implemented, by way of example, by a pseudo-SRAM (PSRAM).

Wireless communication device 16 transmits and receives a signal to and from another game device through wireless communication.

Position data obtaining device 17 is assumed to be able to make use of GPS (Global Positioning System) by way of example. Specifically, position data obtaining device 17 has a GPS receiver, receives radio waves from a GPS satellite, and calculates position data (latitude and longitude) by way of example. Then, the calculated position data is assumed to be stored as communication data to be transmitted to another game device 1 which will be described later.

First Embodiment

Outline of Wireless Communication

Wireless communication between game devices based on the present first embodiment will be described below.

Wireless communication which is a form of communication between game devices 1 will be described.

In the present embodiment, game device 1 can exchange data for application which can be made use of in a predetermined application program (such as a game application), by using a wireless communication function. "Wireless communication" refers to such communication that predetermined data ("position data" in the present first embodiment) stored in internal storage device 14 is directly transmitted automatically (without a user's operation) to another game device 1 present at a short distance and communication data stored in internal storage device 14 of another game device 1 is directly received automatically (without a user's operation) from another game device 1.

More specifically, wireless communication is carried out by cooperation of processor 13, wireless communication device 16, and the like in game device 1. This processing is processing performed as background processing, for example, while game device 1 is in what is called a sleep state (which may also be referred to as a stand-by state). For example, during sleep, such control that wireless communication device 16 basically mainly operates and sleep of processor 13 is temporarily canceled as necessary so that processor 13 temporarily mainly operates is carried out (for example, processing for searching for another game device 1 is performed by wireless communication device 16 and transmission and reception of data is carried out by processor 13). In addition, for example, game device 1 may include, separately from processor 13, a second processor operable with low power consumption, and during sleep, the second processor may mainly operate. Moreover, wireless communication in the present example may be carried out as appropriate during game processing or in response to a user's instruction operation or the like even when game device 1 is not in a sleep state.

In wireless communication, for example, game device 1 repeatedly searches for another unspecified game device 1 present within coverage of near field communication. Then, game device 1 automatically transmits position data to another game device 1 which was found as a result of search, and automatically receives position data stored in internal storage device 14 of another game device from that another game device.

Wireless communication above is carried out, for example, at the time when users each carrying game device 1 pass each other. It is noted that wireless communication between game devices 1 is also referred to as passing communication in the present example. The position data is generated by position data obtaining device 17 prior to wireless communication without a user's operation and stored in advance in a predetermined area of internal storage device 14.

Figure 3:
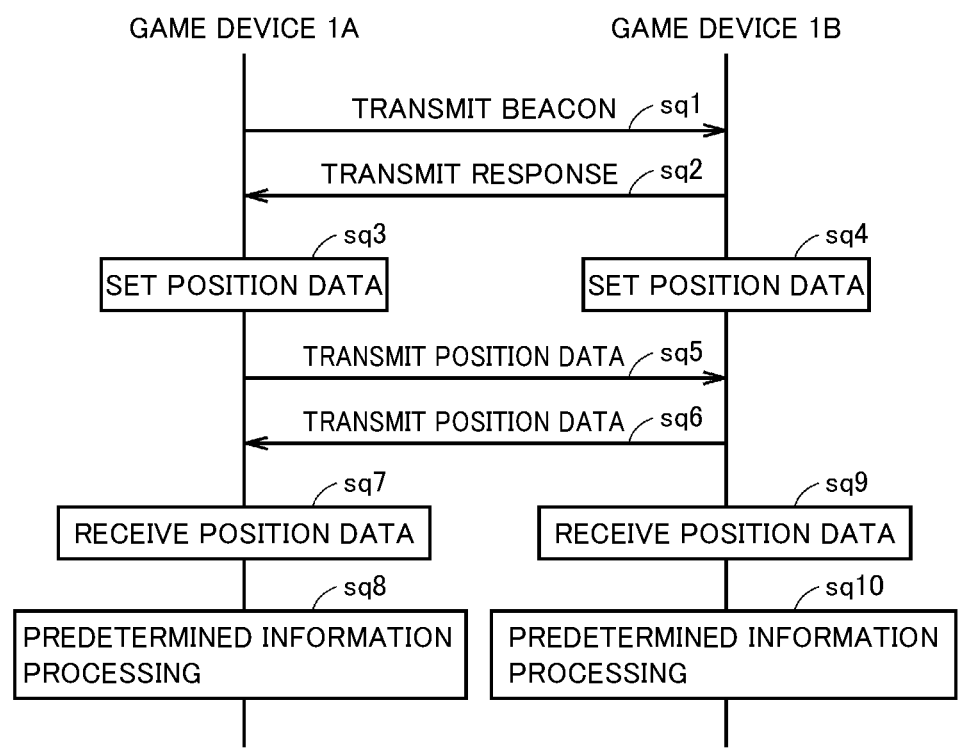
FIG. 3 shows an exemplary illustrative non-limiting diagram of a communication sequence in wireless communication according to a first exemplary embodiment.

FIG. 3 is a diagram of a communication sequence in wireless communication based on the present first embodiment.

As shown in FIG. 3, in the present example, wireless communication between a game device 1A and a game device 1B will be described.

Communication processing for exchanging position data between game device 1A and game device 1B will be described below.

A beacon is transmitted from game device 1A. Game device 1A broadcasts presence of the device itself and a terminal beacon frame indicating contents thereof every predetermined cycle (for example, every 3 sec.) (sequence sq1). Since game device 1B is located within coverage of game device 1A, it receives the terminal beacon frame.

When game device 1B receives the terminal beacon frame, it transmits a response signal to game device 1A in order to establish communication with game device 1A (sequence sq2).

When game device 1A receives the response signal from game device 1B, it establishes communication with game device 1B.

Game device 1A sets position data as communication data to be transmitted to game device 1B with which communication has been established (sequence sq3). Then, game device 1A transmits the communication data including the position data to game device 1B (sequence sq5).

In addition, game device 1B sets position data as communication data to be transmitted to game device 1A with which communication has been established (sequence sq4). Then, game device 1B transmits the communication data including the position data to game device 1A (sequence sq6).

The position data of each device can thus be exchanged between game device 1A and game device 1B.

Then, game device 1A receives the position data transmitted from game device 1B (sequence sq7). The received position data is stored in internal storage device 14. Then, game device 1A performs predetermined information processing based on the received position data (sequence sq8).

In addition, game device 1B receives the position data transmitted from game device 1A (sequence sq9). The received position data is stored in internal storage device 14. Then, game device 1B performs predetermined information processing based on the received position data (sequence sq10).

A communication method described above is merely by way of example, and any communication method may be adopted so long as position data can be exchanged between game device 1A and game device 1B. For example, position data may be exchanged such that a terminal beacon frame is broadcast with position data being included therein and game device 1B which received this frame transmits a response signal with position data being included therein. With this method, a time period required for transmission and reception of data necessary for exchange of position data can be shortened.

It is noted that timing to set position data as communication data may be any time before transmission of the communication data, and for example, in game device 1A, the timing may be before transmission of a terminal beacon frame. This is also the case with game device 1B.

As an example of predetermined information processing, by way of example, it is assumed that display processing based on received position data is performed in game device 1. The display processing will be described later.

In the present embodiment, it is when data of the same game is stored in internal storage device 14 that communication for transmission and reception is carried out.

Though the case that a beacon is transmitted from game device 1A has been described in the present example, in a case that game device 1A and game device 1B are interchanged and a beacon is transmitted from game device 1B as well, position data can be exchanged with the same scheme.

Figure 4:
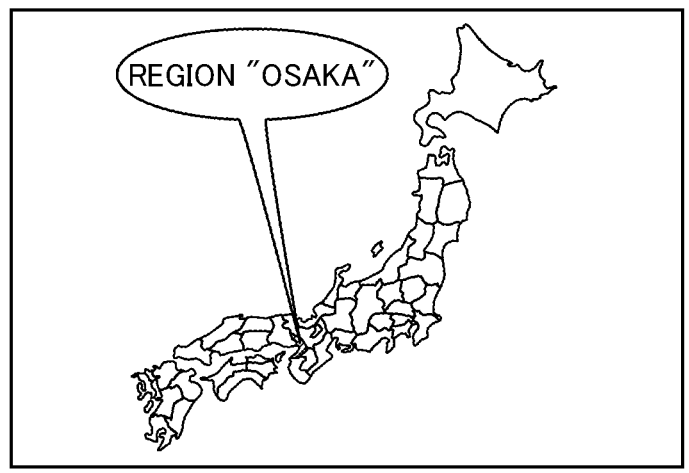
FIG. 4 shows an exemplary illustrative non-limiting diagram illustrating display processing according to the first exemplary embodiment.

FIG. 4 is a diagram illustrating display processing based on the present first embodiment.

Referring to FIG. 4, in the present example, a case that processing at the time when communication data has newly arrived through wireless communication has been performed is shown.

Here, in which region in a map of Japan wireless communication has occurred is displayed based on position data included in communication data. In the present example, it is assumed that a region where communication data has been exchanged through wireless communication is schematically displayed. In the present example, it is shown that wireless communication has occurred in a hatched region "Osaka" in the map of Japan. With such display processing, a user can readily determine in which region passing communication has been carried out.

In a case that a plurality of pieces of communication data have been received, display that wireless communication has occurred in a plurality of regions may be provided based on position data included in each of them.

FIG. 5 is a diagram illustrating an example of other display processing based on the present first embodiment.

Referring to FIG. 5, though the case that a region where wireless communication has occurred is displayed has been described schematically with the use of the map of Japan with reference to FIG. 4, regions where passing communication has occurred so far may be displayed in a list.

By way of example, a region "Osaka", the number of times of passing "100 times", a region "Tokyo", and the number of times of passing "50 times" are shown. As the number of times of passing is displayed in a list, it can readily be grasped in which region and how frequent passing communication has occurred.

It is noted that event processing (for example, obtainment of an item) may occur in accordance with the number of regions where passing communication has been carried out.

By performing the processing, that is, predetermined information processing (in the present example, display processing by way of example) based on position data received from another game device, zest of data communication can further be enhanced.

Figure 6:
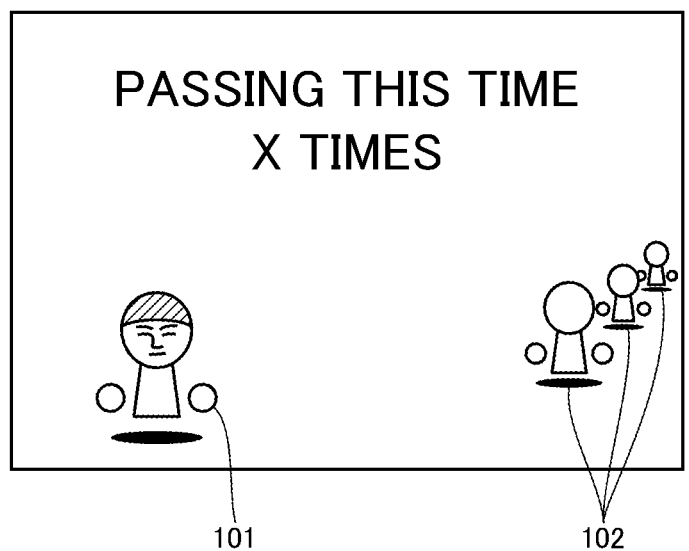
FIG. 6 shows an exemplary illustrative non-limiting diagram illustrating one example of display processing based on character data according to the first exemplary embodiment.

FIG. 6 is a diagram illustrating one example of display processing based on character data based on the present first embodiment.

Referring to FIG. 6, the number of times of wireless communication that has occurred while being out this time is displayed.

A user character 101 created by a user himself/herself is displayed on the left of a screen, and a row of other characters 102 in accordance with data obtained through wireless communication this time is displayed on the right of the screen. In addition, a message indicating the number of times of passing this time is displayed substantially in a center in an upper portion of the screen. Then, such animation that characters from the row of other characters 102 come closer to and pass user's own user character 101 one by one is displayed.

Figure 7:
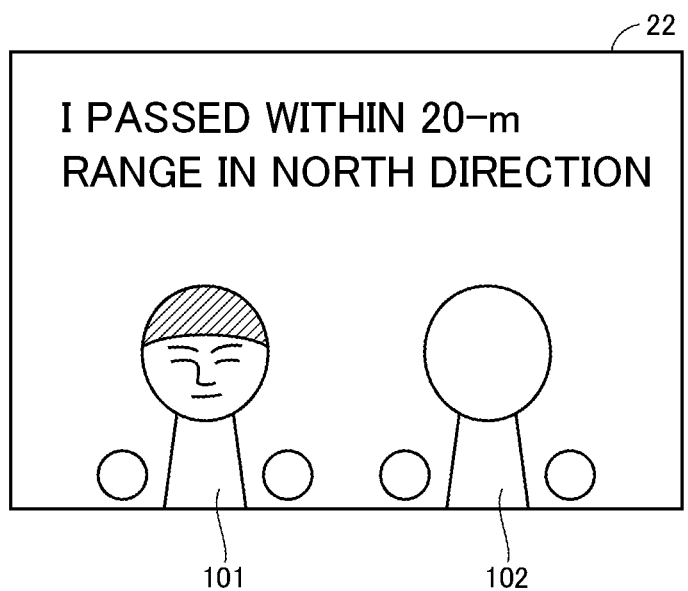
FIG. 7 shows an exemplary illustrative non-limiting diagram illustrating another form of display processing based on position data according to the first exemplary embodiment.

FIG. 7 is a diagram illustrating another form of display processing based on position data, based on the present first embodiment.

Referring to FIG. 7, here, display processing based on position data in a case that another character 102 shown in FIG. 6 has been selected is shown. Specifically, relative positional relation between game devices which carried out exchange is displayed in a message, based on position data received from another game device corresponding to another character 102.

Specifically, a message "I passed within 20-m range in north direction" is displayed. A case is shown that position data has been exchanged between game device 1A and game device 1B. As to a location of exchange, it is shown that a position of game device 1B was in a north direction from a position of game device 1A, based on comparison of position data at the time of exchange and a distance at the time of passing was within 20-m range.

By displaying a situation in which communication was carried out (relative positional relation) in a message, a user can readily grasp information on the situation of communication and zest of data communication can further be enhanced. Though an example in which a direction and a distance are both displayed in a message as relative positional relation has been described in the present example, limitation to such a case is not intended and any one of them may be displayed in a message. This is also applicable hereafter.

Figure 8:
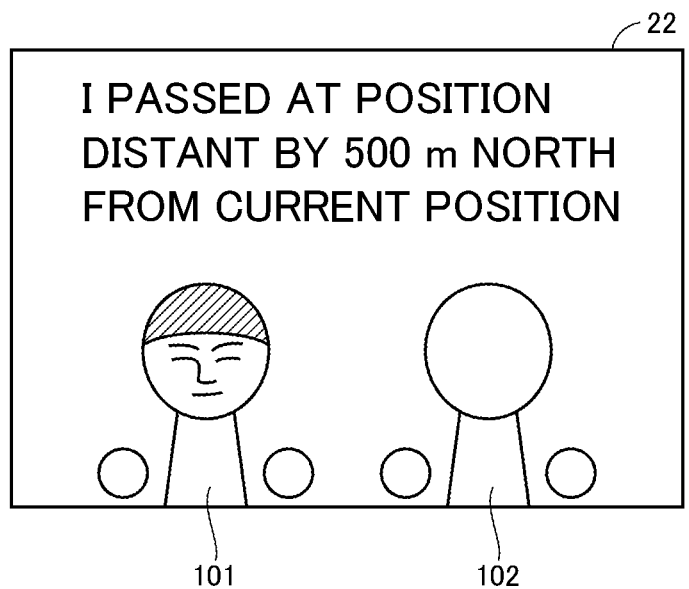
FIG. 8 shows an exemplary illustrative non-limiting diagram illustrating yet another form of display processing based on position data according to the first exemplary embodiment.

FIG. 8 is a diagram illustrating yet another form of display processing based on position data, based on the present first embodiment.

Referring to FIG. 8, here, display processing based on position data in a case that another character 102 shown in FIG. 6 has been selected is shown. Specifically, relative positional relation between game devices which carried out exchange is displayed in a message, based on position data received from another game device corresponding to another character 102.

Specifically, a message "I passed at position distant by 500 m north from current position" is displayed. A case is shown that position data has been exchanged between game device 1A and game device 1B. As to a location of exchange, it is shown that game device 1A has passed game device 1B at a location distant by 500 m in a north direction from current game device 1A based on comparison with current position data of game device 1A.

By displaying a situation in which communication was carried out (relative positional relation) in a message, a user can readily grasp information on the situation of communication and zest of data communication can further be enhanced.

<Various Types of Data>

Details of processing of an application or the like executed by game device 1 will now be described.

Initially, various types of data used during various types of processing will be described.

Figure 9:
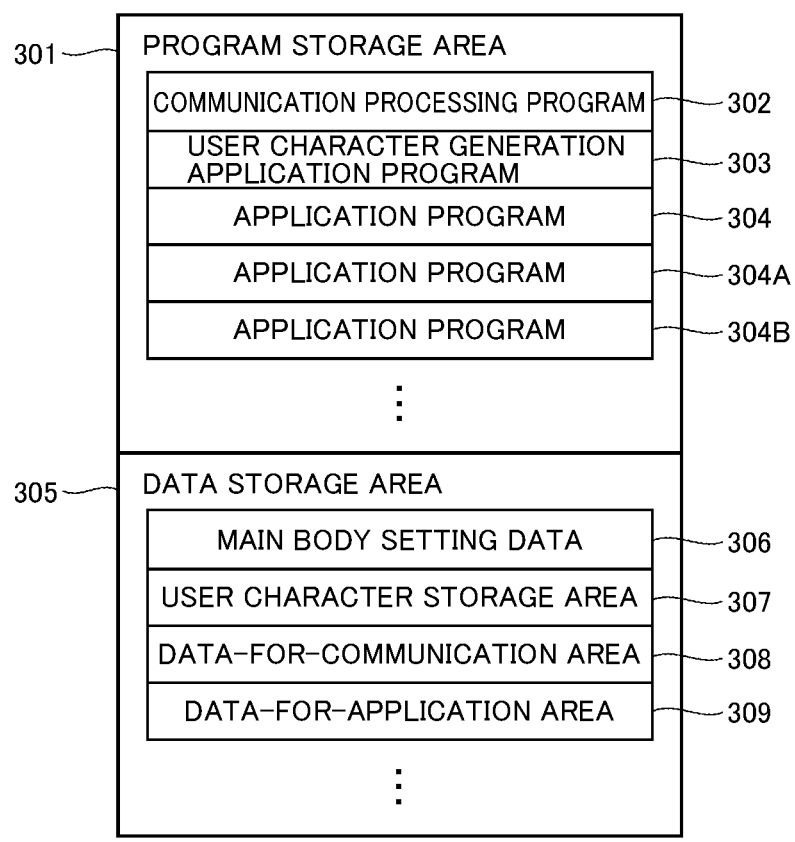
FIG. 9 shows an exemplary illustrative non-limiting diagram showing a memory map of an internal storage device 14 of game device 1 according to the first exemplary embodiment.

FIG. 9 is a diagram showing a memory map of internal storage device 14 of game device 1 based on the present first embodiment.

Referring to FIG. 9, internal storage device 14 includes a program storage area 301 and a data storage area 305. Data in program storage area 301 and data storage area 305 is used as being transferred as appropriate to main memory 15 as necessary during execution of an application.

Program storage area 301 stores various programs to be executed by processor 13. In the present embodiment, a communication processing program 302, a user character generation application program 303, an application program 304, an application program 304A, an application program 304B, and the like are stored.

Communication processing program 302 is a program for carrying out wireless communication in a sleep mode as described above.

User character generation application program 303 is a program for generating a user character of a user himself/herself. By executing user character generation application program 303, a user character made use of in various applications can be set.

Application programs 304, 304A, and 304B are programs, for example, for performing game processing, and for performing different game processing.

Data storage area 305 stores main body setting data 306, a user character storage area 307, a data-for-communication area 308, and a data-for-application area 309.

Main body setting data 306 is setting data mainly on a main body of game device 1, and includes also a device identification number identifying a device, a MAC address used during communication, and the like.

User character storage area 307 is an area for saving a user character. As user character generation application program 303 is executed, data of the user character is saved in user character storage area 307.

Data-for-communication area 308 is an area for saving data used for communication. Reception data, transmission data, and the like are saved.

Data-for-application area 309 is an area storing data used in various applications executed by game device 1.

<Generation of User Character Data>

Figure 10:
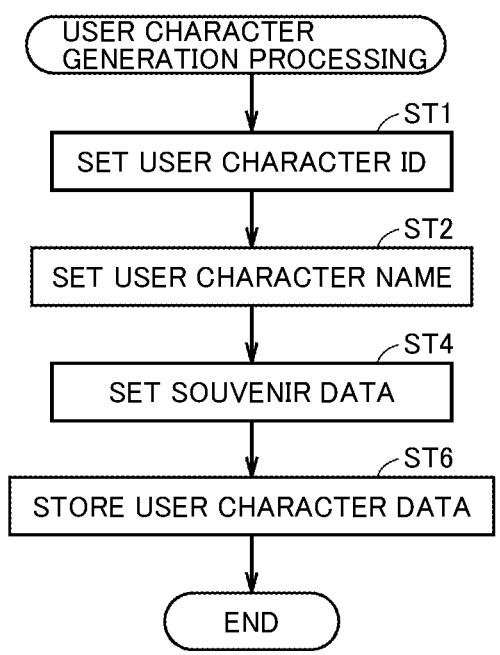
FIG. 10 shows an exemplary illustrative non-limiting flowchart illustrating user character generation processing according to the first exemplary embodiment.

FIG. 10 is a flowchart illustrating user character generation processing based on the present first embodiment.

Referring to FIG. 10, the processing is processing implemented as processor 13 executes user character generation application program 303. The program includes a process for setting information on a user character in response to an operation by a user and newly generating user character data. The generated user character data can be made use of in various application programs and it is made use of in game processing which will be described later, by way of example.

Initially, a user character ID is set (step ST1). The user character ID is an ID for uniquely identifying a user character. In the present embodiment, an ID is generated such that an ID unique all over the world is generated by making use also of a number specific to a main body of a game device (for example, a serial No.). Specifically, a user character ID is generated by making use of a number specific to a main body of a game device and a time and day at the time point of creation of a user character.

Then, an arbitrary user character name is set in response to an input from a user to input device 11 (step ST2).

Then, souvenir data is set in response to an input from a user to input device 11 (step ST4). The souvenir data is data of an item possessed by a user character. It is assumed that, for example, one of a plurality of pieces of souvenir data which are selectably provided is selected as the souvenir data. The souvenir data is data made use of when the user character is transmitted to another game device, although description thereof will be given later.

Then, the generated user character data is stored (step ST6). Specifically, new user character data is stored in user character storage area 307.

Then, the process ends (end). It is noted that user character data can be generated through the processing.

It is noted that parts constituting a character such as a face and a hairstyle of a user character may be set during the user character generation processing. In addition, other information on a character such as birthday, hobby, and favorite food can also be set as attribute information and made use of in game processing or the like.

Figure 11:
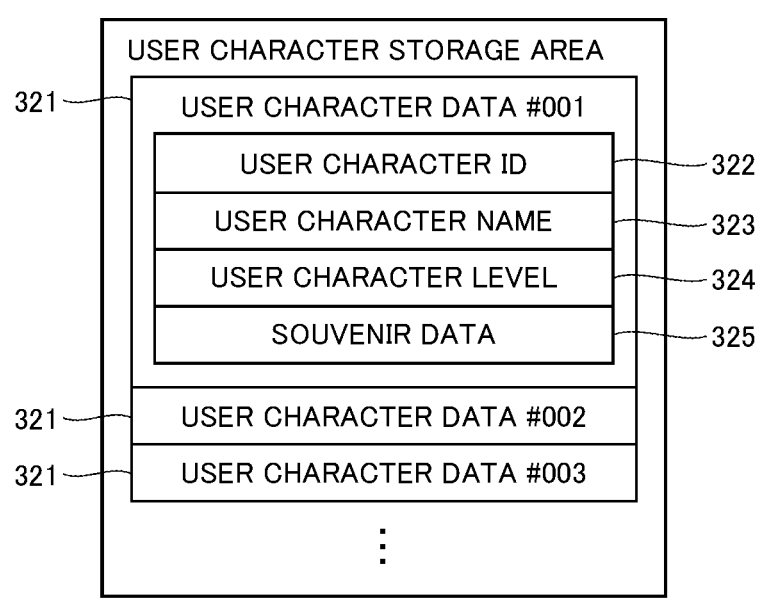
FIG. 11 shows an exemplary illustrative non-limiting diagram showing one example of a configuration of a user character storage area 307 according to the first exemplary embodiment.

FIG. 11 is a diagram showing one example of a configuration of user character storage area 307 based on the present first embodiment.

Referring to FIG. 11, user character storage area 307 is constituted of a set of a plurality of pieces of user character data 321. In this area, in addition to the user character data created by the user himself/herself, obtained user character data of other users is also saved. The user character data of other users was obtained from other game devices through wireless communication. The user character data of other users was generated by user character generation application programs 303 of other game devices.

Each piece of user character data 321 is constituted of a user character ID 322, a user character name 323, a user character level 324, souvenir data 325, and the like, which are set during user character generation processing.

User character name 323 is a name set for each user character in generation of a user character, and it is character string data having, for example, a length up to 10 2-byte characters.

User character level 324 is data indicating a level (a skill level) of a user character. It is assumed that an initial level is set in advance as a level LV1 by way of example. It is assumed, for example, that the level can be made use of in making use of the user character in game processing. For example, as the level is higher, a value for a characteristic parameter of a character in game processing can be higher.

Souvenir data 325 is data on an item set at the time of generation of a user character and possessed by the user character. The data is data made use of in game processing in a case that it is transmitted to another game device through wireless communication and received by another game device by way of example.

<Communication Data>

Figure 12:
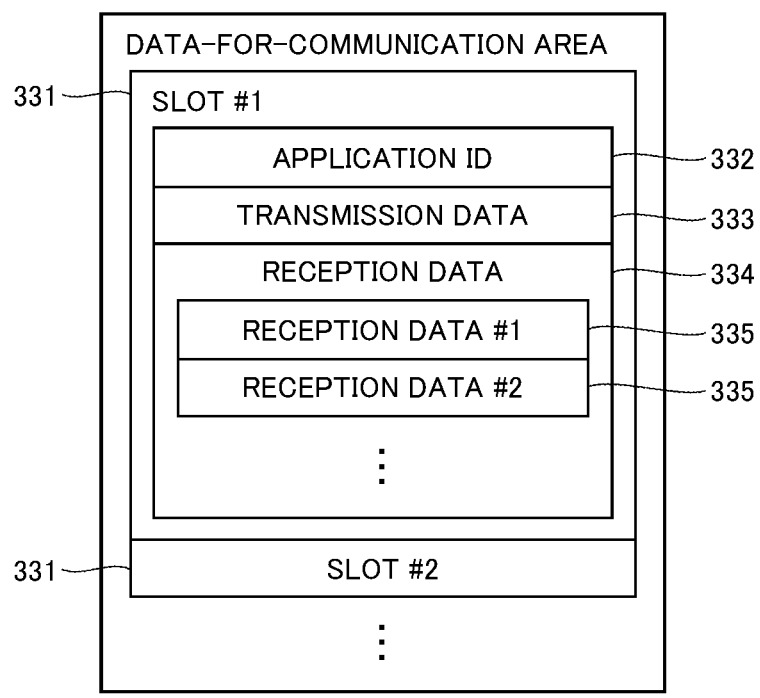
FIG. 12 shows an exemplary illustrative non-limiting diagram showing one example of a configuration of a data-for-communication area 308 according to the first exemplary embodiment.

FIG. 12 is a diagram showing one example of a configuration of data-for-communication area 308 based on the present first embodiment.

Referring to FIG. 12, data-for-communication area 308 includes a plurality of slots 331. Each slot is constituted of an application ID 332, transmission data 333, and reception data 334.

Application ID 332 is an ID for identifying an application using (associated with) the slot.

Transmission data 333 is data to be transmitted to another game device 1 during wireless communication.

Reception data 334 is data received from another game device 1 during wireless communication. Here, a plurality of pieces of reception data 335 similar in configuration to transmission data 333 are stored. Therefore, description of each piece of reception data 335 is not provided.

Figure 13:
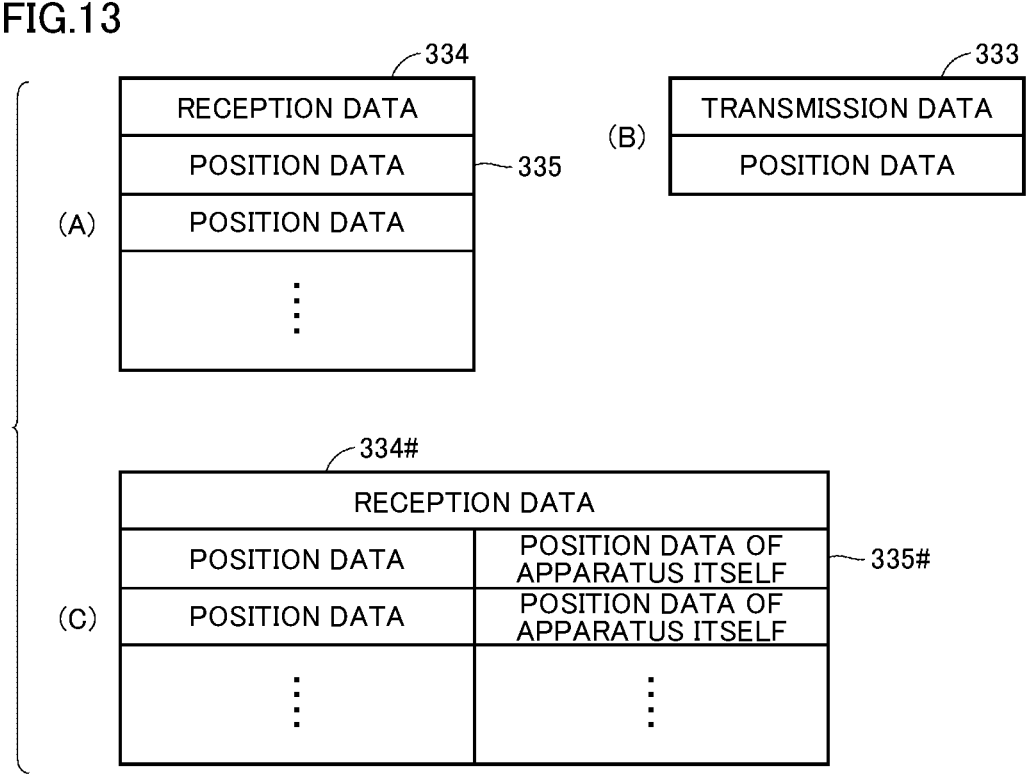
FIG. 13 shows an exemplary illustrative non-limiting diagram illustrating one example of communication data stored in the data-for-communication area according to the first exemplary embodiment.

FIG. 13 is a diagram illustrating one example of communication data stored in the data-for-communication area based on the present first embodiment.

Referring to FIG. 13 (A), here, a specific example of reception data 334 received through passing communication is shown. Specifically, position data received through communication with another game device is stored as reception data 335. Display processing as described with reference to FIG. 4 or 5 can be performed based on the position data.

Referring to FIG. 13 (B), here, a specific example of transmission data 333 to be transmitted through passing communication is shown. Specifically, position data to be transmitted through communication with another game device is stored as transmission data 333. The position data is data obtained by position data obtaining device 17 of the game device. With regard to the position data stored as transmission data 333, position data obtained by position data obtaining device 17 at the time of transmission of communication data may be stored, or position data obtained by position data obtaining device 17 may be overwritten and updated as transmission data 333 every predetermined cycle.

Referring to FIG. 13 (C), here, a specific example of reception data received through passing communication, which is different from that in FIG. 13 (A), is shown. Specifically, a case that received position data and position data of the game device (position data of apparatus itself) obtained by position data obtaining device 17 at the time of reception are stored as reception data 335# in association with each other is shown. With this scheme, position data of the game device at the time when communication was carried out (a time point of exchange of communication data (time point of exchange)) can be set in association. Thus, relative positional relation between game devices at the time point of exchange can be calculated. It is noted that position data obtained by position data obtaining device 17 at the time of reception of position data from another game device may be stored in association, or position data of the game device stored as transmission data may be stored as communication data in association.

Figure 14:
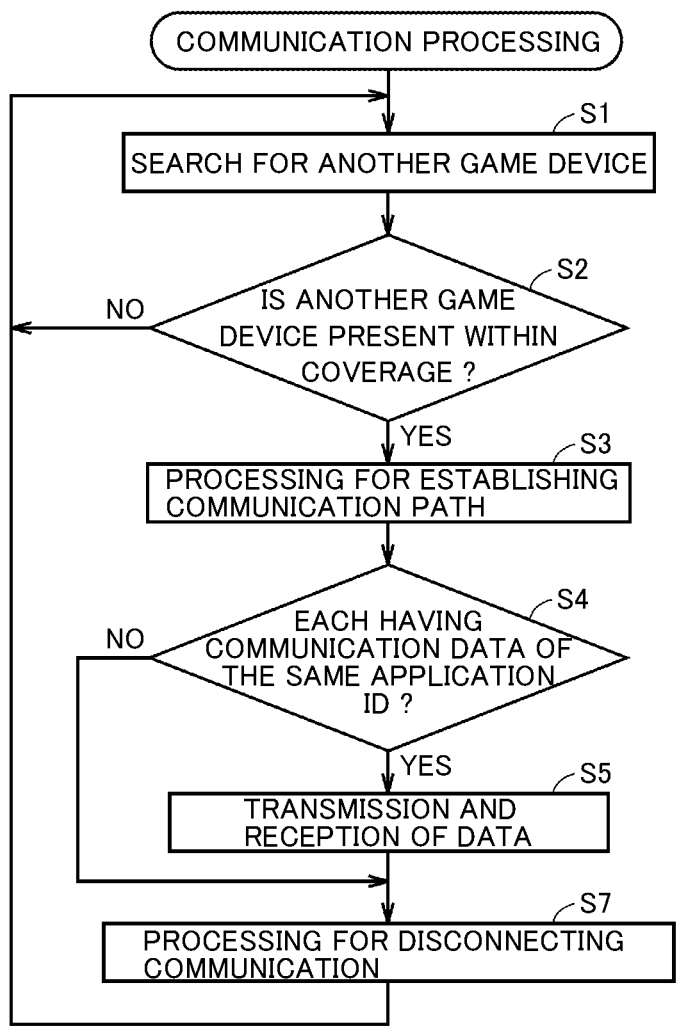
FIG. 14 shows an exemplary illustrative non-limiting flowchart illustrating communication processing according to the first exemplary embodiment.

FIG. 14 is a flowchart illustrating communication processing based on the present first embodiment.

Referring to FIG. 14, the communication processing is performed as processor 13, wireless communication device 16, and the like of game device 1 cooperate. Specifically, it is performed as processor 13 executes communication processing program 302 and cooperates with wireless communication device 16.

This processing is processing performed as background processing, for example, while game device 1 is in what is called a sleep state (which may also be referred to as a stand-by state).

For example, during sleep, such control that wireless communication device 16 basically mainly operates and sleep of processor 13 is temporarily canceled as necessary so that processor 13 temporarily mainly operates is carried out (for example, processing for searching for another game device is performed by wireless communication device 16 and transmission and reception of data is carried out by processor 13). In addition, for example, separately from processor 13, a second processor operable with low power consumption may be provided, and during sleep, the second processor may mainly operate. Moreover, the present processing may be performed as appropriate in response to a user's instruction operation or the like even when a sleep state is not set.

Initially, processing for searching for another game device 1 is performed (step S1). This is performed, for example, as each game device 1 repeats processing for transmitting a beacon indicating a connection request and processing for receiving this beacon.

Then, as a result of search, whether or not another game device 1 is present within coverage is determined (step S2). For example, when a response signal to the transmitted beacon is received from another game device 1 within a predetermined time period or when the beacon from another game device 1 is received, affirmative determination is made.

When it is determined in step S2 that another game device 1 is not present within coverage (NO in step S2), the process returns to step S1 and the processing is repeated.

On the other hand, when it is determined in step S2 that another game device 1 is present within coverage (YES in step S2), processing for establishing a communication path for carrying out communication is performed (step S3).

Then, when the communication path has been established, application ID 332 is transmitted and received, and whether or not each has the same application ID 332 is determined (step S4). Namely, whether or not both have prepared communication data for the same game is determined.

When it is determined in step S4 that both have the same application ID 332 (YES in step S4), processing for transmitting transmission data 333 and processing for receiving and storing data sent from another game device as reception data 335 are performed (step S5).

Then, processing for disconnecting communication is performed (step S7). Thereafter, the process returns to step S1 and the processing above is repeated, for example, until a sleep state is canceled.

On the other hand, when it is not determined that both have the same application ID 332 (NO in step S4), the processing in step S5 is skipped and the process proceeds to step S7, where processing for disconnecting communication is performed (step S7). Thereafter, the process returns to step S1 and the processing above is repeated, for example, until a sleep state is canceled. For example, when the game is not the same, communication for transmission and reception is not carried out. In the present example, it is assumed that an application program relating to the same game processing is stored in game devices 1A and 1B.

<Game Processing>

Figure 15:
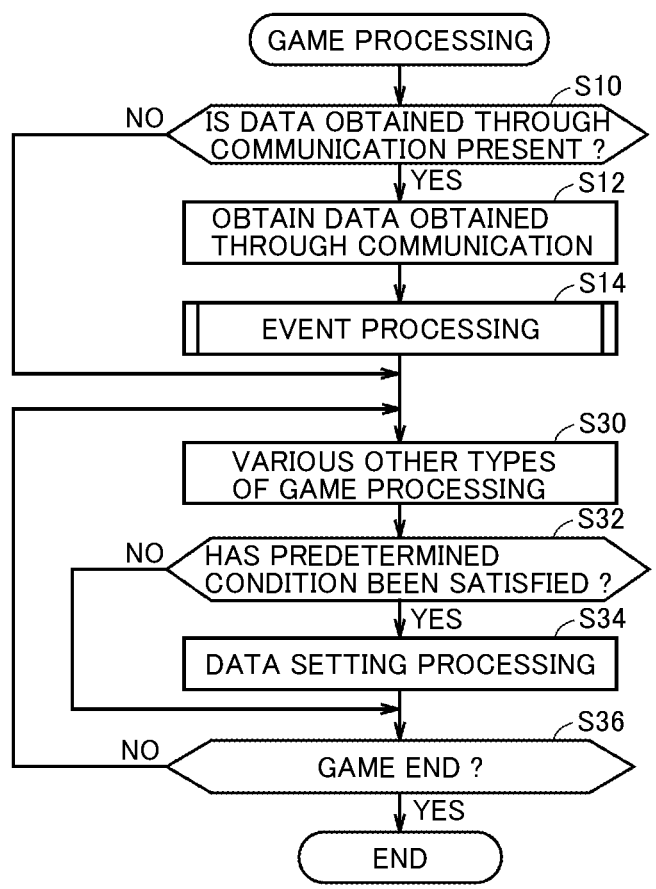
FIG. 15 shows an exemplary illustrative non-limiting flowchart illustrating a flow of game processing in game device 1 according to the first exemplary embodiment.

FIG. 15 is a flowchart illustrating a flow of game processing in game device 1 based on the present first embodiment.

Referring to FIG. 15, the game processing is processing implemented as processor 13 of game device 1 executes application program 304.

Then, data-for-communication area 308 is referred to, and whether or not new reception data (reception data) received through communication is present in slot 331 of a corresponding application ID is determined (step S10).

Then, when it is determined in step S10 that newly obtained reception data is present in reception data 334 (YES in step S10), data obtained through communication is obtained (step S12).

Then, event processing based on the obtained data is performed (step S14). The event processing will be described later.

Then, various other types of game processing are performed (step S30).

When it is determined in step S32 that a predetermined condition has been satisfied (YES in step S32), data setting processing is performed (step S34). In the present example, when a predetermined operation is performed by way of example, processing for setting transmission data is performed. For example, though details are not described, character data possessed by a user may be stored in transmission data to be transmitted together with position data.

When it is determined in step S32 that data does not satisfy a predetermined condition (NO in step S32), step S34 is skipped and whether or not to end a game is determined (step S36). For example, determination can be made based on whether or not a user has instructed end.

When it is determined in step S36 that the game is to end (YES in step S36), the process ends (end).

On the other hand, when it is determined in step S36 that the game is not to end (NO in step S36), the process returns to step S30 and various other types of game processing are performed. Then, the processing above is repeated.

<Event Processing>

Figure 16:
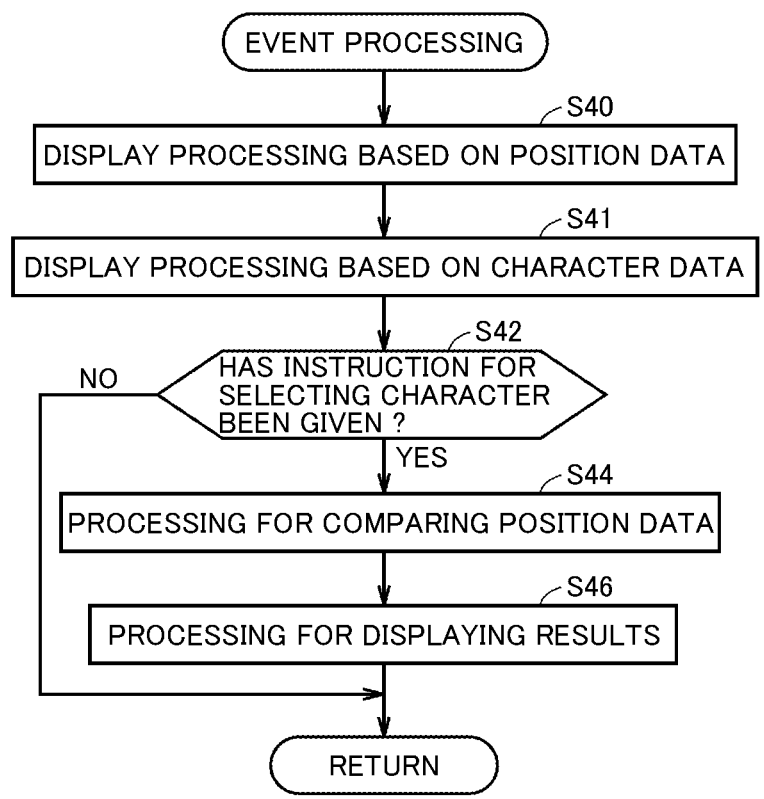
FIG. 16 shows an exemplary illustrative non-limiting flowchart illustrating event processing during the game processing according to the first exemplary embodiment.

FIG. 16 is a flowchart illustrating event processing during the game processing based on the present first embodiment.

Referring to FIG. 16, initially, display processing based on position data is performed (step S40).

Specifically, the display processing described with reference to FIG. 4 is performed. In which region within the map of Japan wireless communication has occurred is displayed based on position data included in received communication data described with reference to FIG. 13. It is noted that, in a case that a plurality of pieces of position data have been received, occurrence of wireless communication in a plurality of regions may be displayed based on position data included in each piece of data.

Then, display processing based on character data is performed (step S41). Specifically, the display processing shown in FIG. 6 is performed based on user character data generated during user character generation processing.

Then, whether or not an instruction for selecting a character being displayed has been given is determined (step S42). Specifically, whether or not an instruction for selecting another character 102 has been given is determined.

When it is determined in step S42 that an instruction for selecting a character has been given (YES in step S42), processing for comparing position data is performed (step S44).

Then, processing for displaying results based on comparison processing is performed (step S46).

Specifically, the display processing described with reference to FIG. 7 or 8 is performed. By way of example, relative positional relation between game devices as described above can be displayed in a message, based on position data included in the received communication data described with reference to FIG. 13 (C).

Then, the process ends (return).

On the other hand, when it is determined in step S42 that an instruction for selecting a character was not given (NO in step S42), the process ends after skipping (return).

Through the event processing, display processing based on position data is performed so that zest of data communication can be enhanced.

(Modification)

Outline of wireless communication based on a modification of the present first embodiment will be described.

Figure 17:
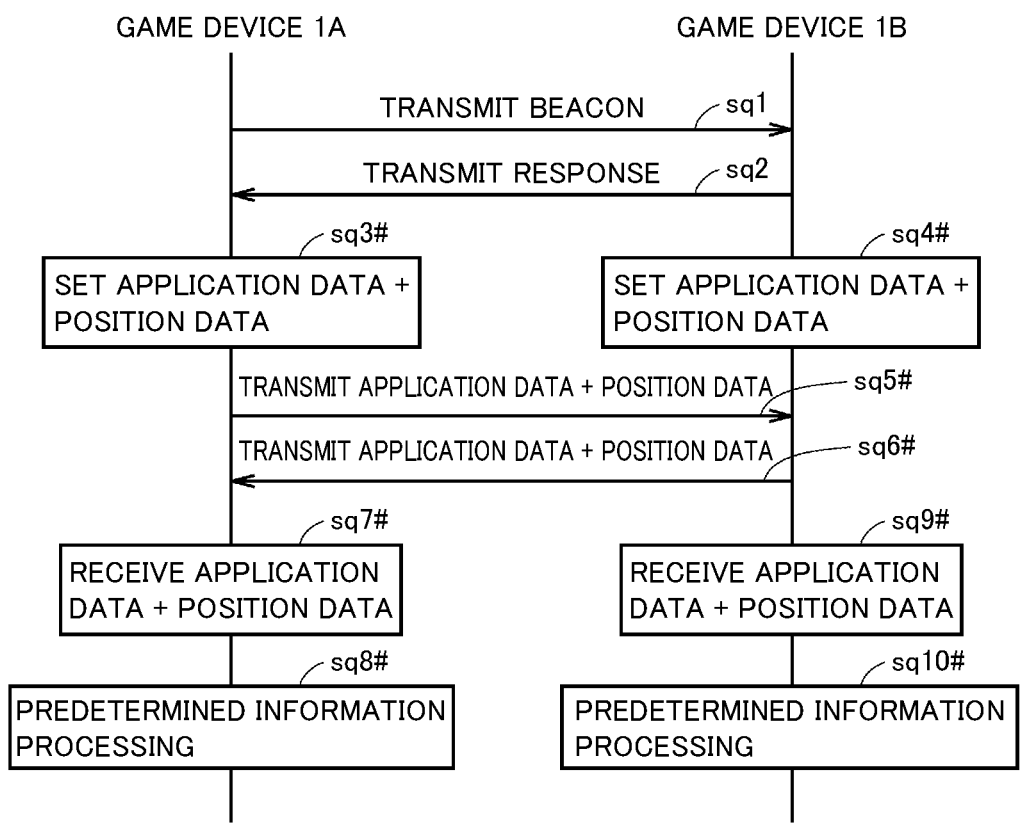
FIG. 17 shows an exemplary illustrative non-limiting diagram of a communication sequence in wireless communication according to a modification of the first exemplary embodiment.

FIG. 17 is a diagram of a communication sequence in wireless communication based on the modification of the present first embodiment.

As shown in FIG. 17, in the present example, wireless communication between game device 1A and game device 1B will be described.

Communication processing for exchanging position data between game device 1A and game device 1B will be described below.

A beacon is transmitted from game device 1A. Game device 1A broadcasts presence of the device itself and a terminal beacon frame indicating contents thereof every predetermined cycle (for example, every 3 sec.) (sequence sq1). Since game device 1B is located within coverage of game device 1A, it receives the terminal beacon frame.

When game device 1B receives the terminal beacon frame, it transmits a response signal to game device 1A in order to establish communication with game device 1A (sequence sq2).

When game device 1A receives the response signal from game device 1B, it establishes communication with game device 1B.

Game device 1A sets application data and position data as communication data to be transmitted to game device 1B with which communication has been established (sequence sq3#). Then, game device 1A transmits the communication data including the application data and the position data to game device 1B (sequence sq5#).

In addition, game device 1B sets application data and position data as communication data to be transmitted to game device 1A with which communication has been established (sequence sq4#). Then, game device 1B transmits the communication data including the application data and the position data to game device 1A (sequence sq6#).

The application data and the position data of each device can thus be exchanged between game device 1A and game device 1B.

Then, game device 1A receives the application data and the position data transmitted from game device 1B (sequence sq7#). The received application data and position data are stored in internal storage device 14. Then, game device 1A performs predetermined information processing based on the received application data and position data (sequence sq8#).

In addition, game device 1B receives the application data and the position data transmitted from game device 1A (sequence sq9#). The received application data and position data are stored in internal storage device 14. Then, game device 1B performs predetermined information processing based on the received application data and position data (sequence sq10#).

By way of example, as predetermined information processing based on the modification of the present first embodiment, event processing based on the position data and the application data is performed. It is assumed in the present example that character data possessed by a user is set as the application data in communication data.

It is assumed in the present example that, in game device 1A and game device 1B, character data and position data are set as communication data to be transmitted together.

<Event Processing>

Figure 18:
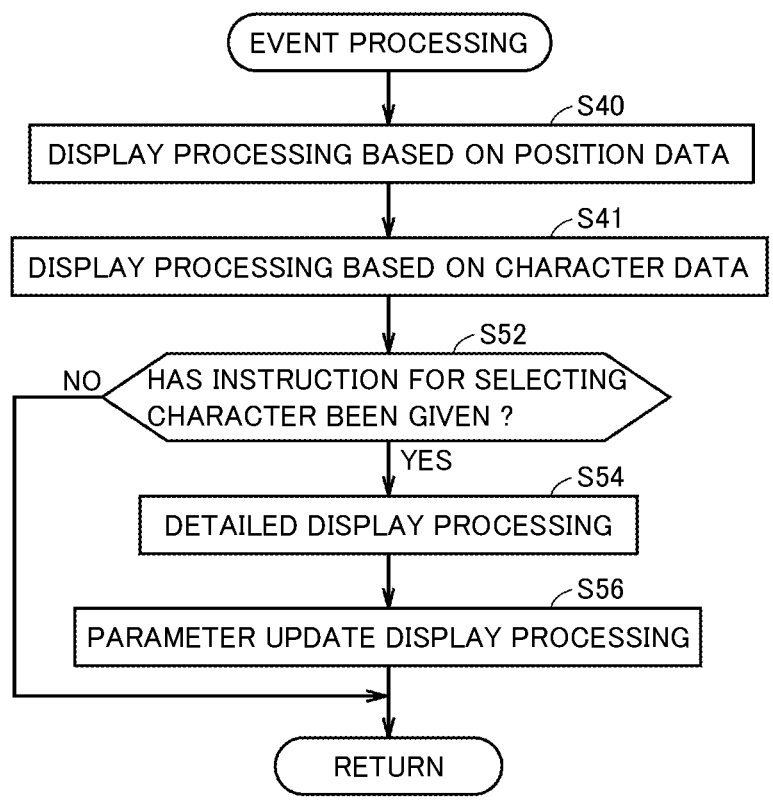
FIG. 18 shows an exemplary illustrative non-limiting flowchart illustrating event processing according to the modification of the first exemplary embodiment.

FIG. 18 is a flowchart illustrating event processing based on the modification of the present first embodiment.

Referring to FIG. 18, initially, display processing based on position data is performed (step S40).

Specifically, the display processing described with reference to FIG. 4 is performed. As described above, in which region within the map of Japan wireless communication has occurred is displayed based on position data included in communication data. It is noted that, in a case that a plurality of pieces of position data have been received, display that wireless communication has occurred in a plurality of regions may be provided based on position data included in each of them.

Then, display processing based on character data is performed (step S41). Specifically, the display processing shown in FIG. 6 is performed based on user character data generated during user character generation processing.

Then, whether or not an instruction for selecting a character being displayed has been given is determined (step S52). Specifically, whether or not an instruction for selecting another character 102 has been given is determined.

When it is determined in step S52 that an instruction for selecting a character has been given (YES in step S52), detail display processing is performed (step S54). Details of the detail display processing will be described later.

Then, parameter update display processing is performed (step S56). Details of the parameter update display processing will be described later.

Then, the process ends (return).

On the other hand, when it is determined in step S52 that an instruction for selecting a character being displayed was not given (NO in step S52), the process ends after skipping (return).

Through the event processing, display processing based on position data is performed, so that zest of data communication can be enhanced.

Figure 19:
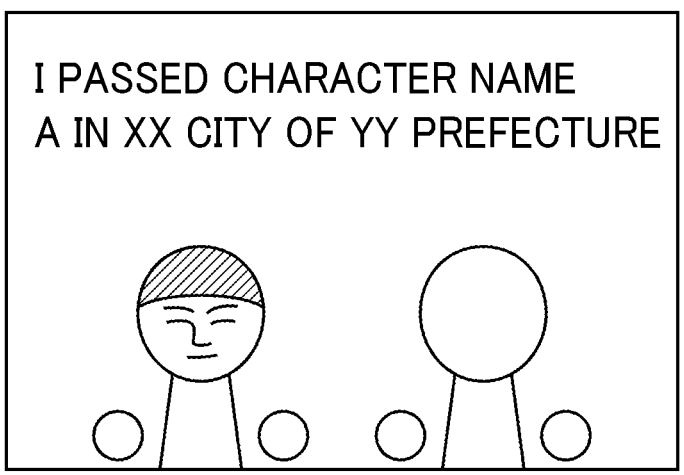
FIG. 19 shows an exemplary illustrative non-limiting diagram illustrating detail display processing based on position data according to the modification of the first exemplary embodiment.

FIG. 19 is a diagram illustrating the detail display processing based on position data, based on the modification of the present first embodiment.

Referring to FIG. 19, here, detailed data at the time of exchange of communication data is displayed, based on position data and application data included in communication data received from another game device.

Specifically, a message "I passed character name A in XX city of YY prefecture" is displayed. "XX city of YY prefecture" is displayed based on the received position data. In addition, "character name A" is displayed in accordance with a character name included in the received character data.

By performing the processing, that is, predetermined information processing (in the present example, display processing by way of example) based on the position data and the application data (character data) received from another game device, zest of data communication can further be enhanced.

Figure 20:
FIG. 20 shows an exemplary illustrative non-limiting diagram illustrating parameter update display processing according to the modification of the first exemplary embodiment.

FIG. 20 is a diagram illustrating the parameter update display processing based on the modification of the present first embodiment.

Referring to FIG. 20, here, a case that a message "level has been raised by souvenir from character name A" is displayed is shown.

Based on souvenir data included in the received character data, change in parameter of a character level of user character data of the game device is shown.

Figure 21:
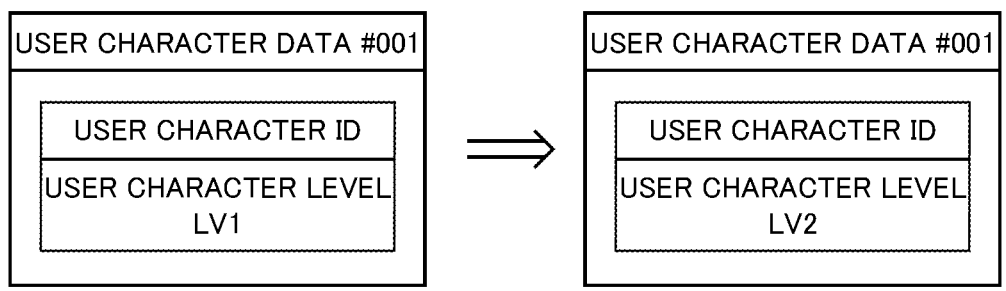
FIG. 21 shows an exemplary illustrative non-limiting diagram illustrating update of a parameter of user character data according to the modification of the first exemplary embodiment.

FIG. 21 is a diagram illustrating update of a parameter of user character data based on the modification of the present first embodiment.

Referring to FIG. 21, a case that a user character level of user character data #001 has varied from a level LV1 to LV2 is shown.

By performing the processing, that is, predetermined information processing (in the present example, processing for updating a parameter by way of example) based on the position data and the application data (character data) received from another game device as well as on the application data (character data) of the game device, zest of data communication can further be enhanced.

Though the case that a parameter (a level) of user character data is updated based on souvenir data has been described in the present example, not only fixed update in connection with update of a parameter but also change in an amount of update of a parameter can be made. Specifically, an amount of update of a parameter can also be changed, based on a distance based on the position data received from another game device and the position data of the game device. For example, when a distance is small, change in an amount of update of a parameter may be made greater, and when a distance is great, change in an amount of update of a parameter may be made smaller.

Second Embodiment

In the first embodiment above, the case that position data is exchanged through wireless communication with another game device while a game device is in a sleep state has been described.

On the other hand, position data can be transmitted and received (exchanged) by carrying out wireless communication with another game device during execution of a normal application, without being limited to during the sleep state.

In the present second embodiment, a case that information processing based on position data received from another game device by communicating with another game device during execution of game processing, that is, as a part of the game processing, is performed will be described.

By way of example, in the game processing in the present example, information processing for readily grasping a position of another game device based on position data is performed.

Figure 22:
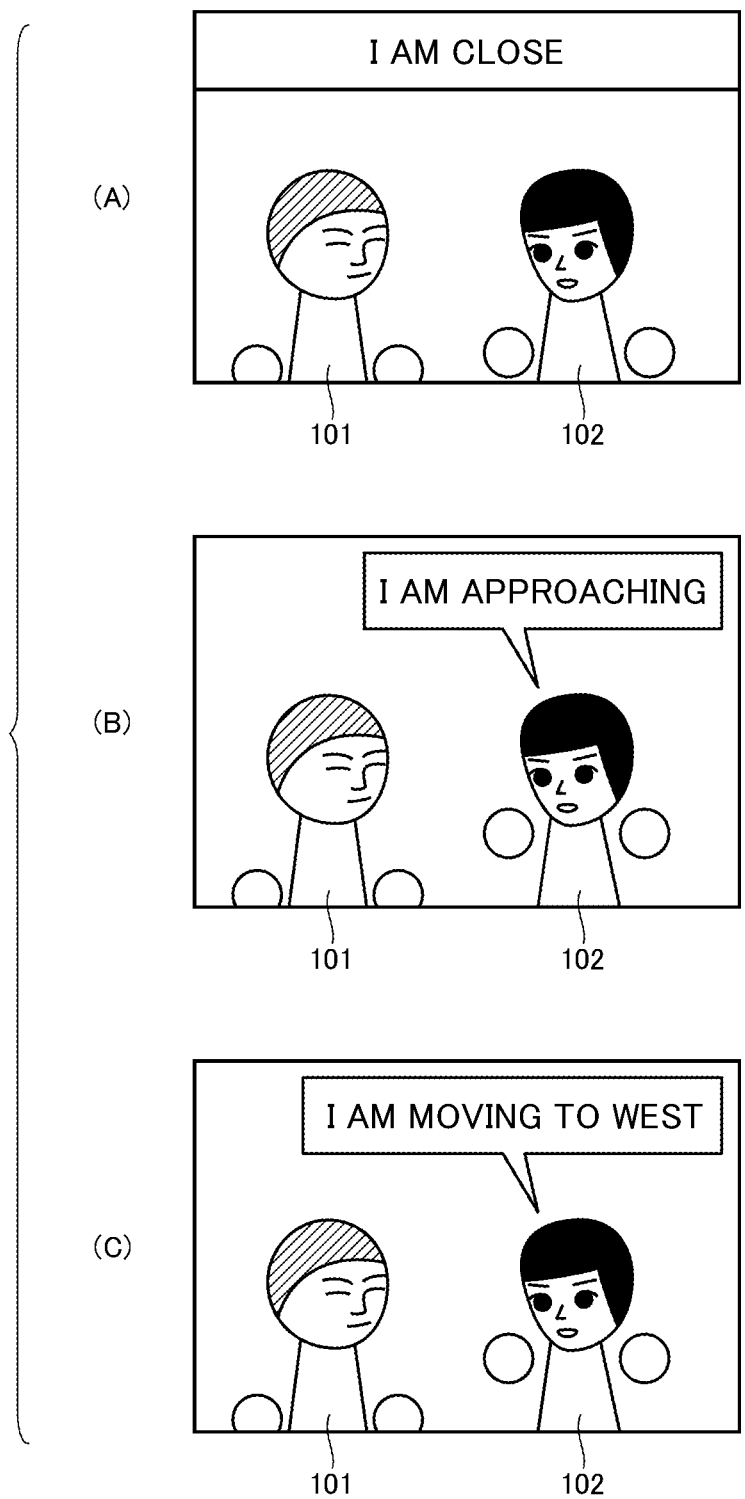
FIG. 22 shows an exemplary illustrative non-limiting diagram illustrating display processing based on position data according to a second exemplary embodiment.

FIG. 22 is a diagram illustrating display processing based on position data, based on the present second embodiment.

Referring to FIG. 22 (A), here, a message of relative positional relation between communicating game devices is displayed based on position data received from another game device.

Specifically, a case that user character 101 created by a user himself/herself is displayed on a screen and character 102 corresponding to another communicating game device is displayed on the right of the screen is shown. Then, in that state, a message "I am close" is displayed substantially in a center in an upper portion of the screen. Wireless communication for exchanging position data between game device 1A and game device 1B is carried out while game processing is performed. Then, the message shows a case that a distance between game device 1A and game device 1B is small in accordance with the exchanged position data.

Through the processing, the user can have a grasp of the fact that a position of another game device is close, and for example, the user can easily meet a user possessing another game device.

When a distance between game device 1A and game device 1B is greater than a predetermined distance serving as a threshold value in accordance with the exchanged position data, a message "I am far away" may be displayed.

In addition, referring to FIG. 22 (B), here, a message in a case that relative positional relation between communicating game devices has changed is displayed, based on repeated continual reception of position data from another game device and a plurality of pieces of received position data.

Specifically, a case that user character 101 created by the user himself/herself is displayed on the screen and character 102 corresponding to another communicating game device is displayed on the right of the screen is shown. Then, in that state, a message "I am approaching" is displayed substantially in the center in the upper portion of the screen. Wireless communication for exchanging position data between game device 1A and game device 1B is carried out while game processing is performed. The processing is repeated and the message is displayed based on history of position data. Then, the message shows a case that a distance between game device 1A and game device 1B has changed in accordance with the exchanged position data. In the present example, by way of example, a case that a distance from each other has become smaller is shown.

Through the processing, the user can have a grasp of the fact that another game device is approaching, and for example, the user can easily meet a user possessing another game device.

When a distance between game device 1A and game device 1B becomes greater in accordance with the exchanged position data, a message "I am moving away" may be displayed.

In addition, referring to FIG. 22 (C), here, another message in a case that relative positional relation between communicating game devices has changed by repeatedly exchanging position data is displayed.

Specifically, a case that user character 101 created by the user himself/herself is displayed on the screen and character 102 corresponding to another communicating game device is displayed on the right of the screen is shown. Then, in that state, a message "I am moving to west" is displayed substantially in the center in the upper portion of the screen. A message based on movement and change of game device 1B is displayed in accordance with exchanged history data (a trace of position data) of another game device 1B in the case that position data is exchanged between game device 1A and game device 1B.

Through the processing, since a trace of movement of another game device can be grasped, a situation of movement of a user possessing another game device can readily be grasped, which allows easy encounter with a user possessing another game device.

It is assumed that the game processing based on the present second embodiment is performed with game device 1B registered in advance, by way of example.

Specifically, it is assumed that a device permitted to continually exchange position data with a device during the game processing is set in advance. In the present second embodiment, data on a device permitted to exchange position data is stored in a friend registration list.

FIG. 23 is a diagram illustrating one example of a friend registration list stored in a data storage area based on the present second embodiment.

Referring to FIG. 23, here, in the friend registration list, a list of device names is shown and a flag for determining whether or not a device is registered as friend is set.

By way of example, it is assumed that a device B and a device C are shown and device B and device C are registered as friends ("O" is shown). It is assumed that position data is not exchanged with a device which is not registered as friend.

Though denotation as device B and device C is provided by way of example here, actually, a device identification number which is uniquely set and allows identification of each device can be made use of. Alternatively, a MAC address provided specifically to each device may be made use of.

In generation of the friend registration list, processor 13 executes an application for generating a friend registration list, so that each device can be set in the list.

Figure 24:
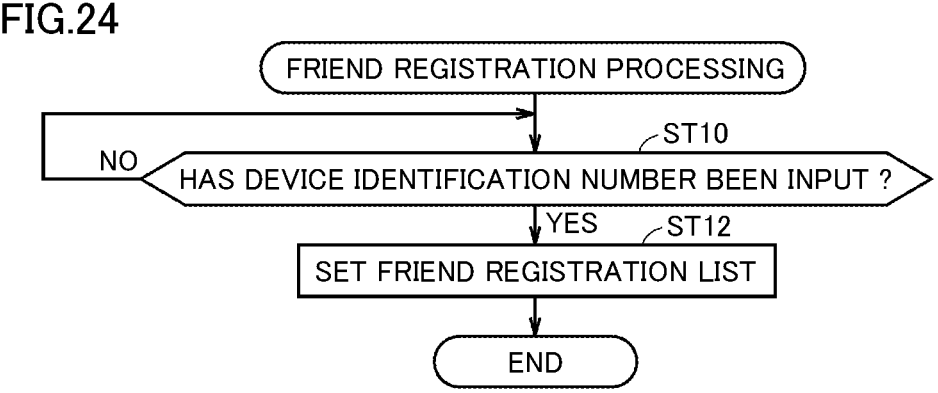
FIG. 24 shows an exemplary illustrative non-limiting flowchart illustrating friend registration processing according to the second exemplary embodiment.

FIG. 24 is a flowchart illustrating friend registration processing based on the present second embodiment.

Referring to FIG. 24, the processing is realized as processor 13 executes an application for generating a friend registration list as described above.

Initially, whether or not a device identification number has been input is determined (step ST10).

Then, when it is determined in step ST10 that a device identification number has been input (YES in step ST10), setting in the friend registration list is made (step ST12).

Then, the process ends (end).

On the other hand, when it is determined in step ST10 that a device identification number has not been input (NO in step ST10), a state in step ST10 is maintained.

Through the processing, a predetermined device registered in the friend registration list can be identified, and in the present example, position data in connection with the predetermined device is exchanged during the game processing and predetermined information processing based on the obtained position data is performed.

Figure 25:
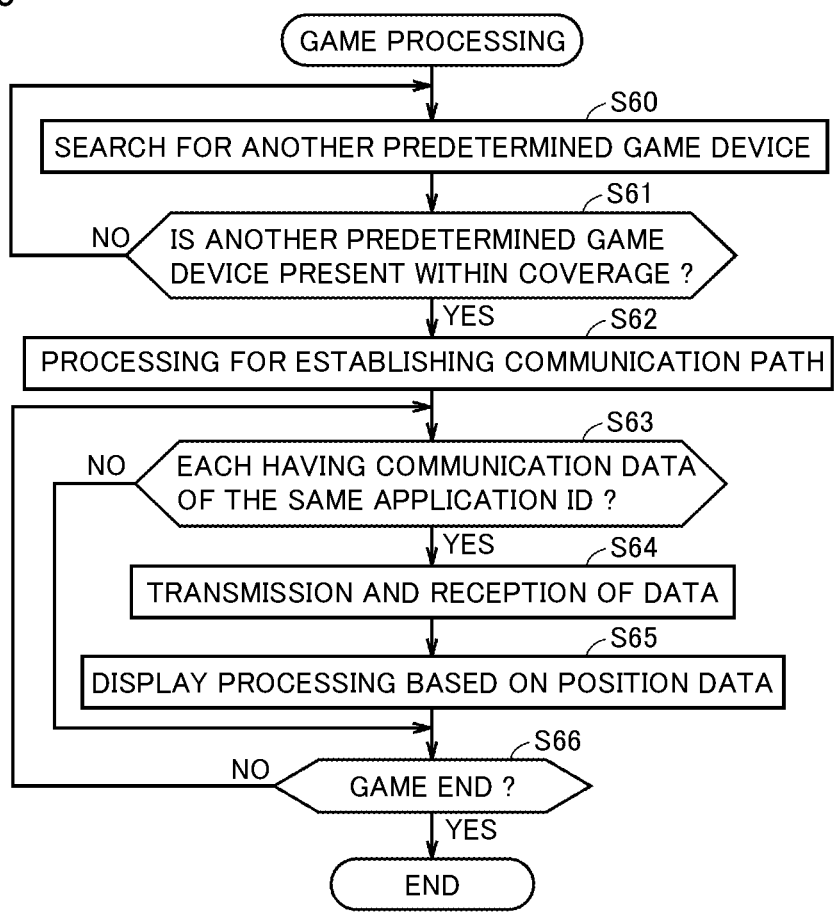
FIG. 25 shows an exemplary illustrative non-limiting flowchart illustrating game processing according to the second exemplary embodiment.

FIG. 25 is a flowchart illustrating game processing based on the present second embodiment.

Referring to FIG. 25, the game processing is performed by processor 13 of game device 1. Specifically, it is performed as processor 13, wireless communication device 16, and the like of game device 1 cooperate. Specifically, it is performed as processor 13 executes application program 304A and cooperates with wireless communication device 16.

Initially, processing for searching for another predetermined game device 1 is performed (step S60). This is performed, for example, as each game device 1 repeats processing for transmitting a beacon indicating a connection request and processing for receiving this beacon.

Then, as a result of search, whether or not another predetermined game device 1 is present within coverage is determined (step S61). For example, when a response signal to the transmitted beacon is received from another predetermined game device 1 within a predetermined time period or when the beacon from another predetermined game device 1 is received, affirmative determination is made.

Another predetermined game device means a game device registered in advance as friend. Namely, when a response signal or a beacon from a game device registered in the friend registration list is received, affirmative determination is made. Specifically, whether or not a device identification number is registered in the friend registration list is determined based on the device identification number included in the response signal from another game device. Then, when it is registered in the friend registration list, it is determined that another predetermined game device is present.

When it is determined in step S61 that another predetermined information processing apparatus is present within coverage (YES in step S61), processing for establishing a communication path for carrying out communication with another predetermined information processing apparatus is performed (step S62).

On the other hand, when it is determined that another predetermined information processing apparatus is not present within coverage (NO in step S61), the process returns to step S60 and the search processing is continued.

Then, when the communication path has been established, in step S63, application ID 332 is transmitted and received and whether or not each has the same application ID 332 is determined (step S63). Namely, whether or not both have prepared communication data for the same game is determined.

When it is not determined in step S63 that both have the same application ID 332 (NO in step S63), steps S64, S65 are skipped and the process proceeds to step S66.

On the other hand, when it is determined in step S63 that both have the same application ID 332 (YES in step S63), processing for transmitting transmission data 333 and processing for receiving and storing data sent from another game device as reception data 335 are performed (step S64).

Then, display processing based on position data is performed (step S65).

Specifically, the display processing described with reference to FIG. 22 is performed. Relative positional relation with another game device with which communication has been carried out can be grasped based on position data included in communication data.

Then, whether or not a game has ended is determined (step S66).

When it is determined in step S66 that the game has ended (YES in step S66), the process ends (end).

On the other hand, when it is determined in step S66 that the game has not ended (NO in step S66), the process returns to step S63 and data is again communicated so as to receive position data from another predetermined information processing apparatus. Then, display processing based on received position data is repeatedly performed.

Specifically, the display processing described with reference to FIG. 22 is performed. In this regard, as the display processing in FIG. 22 (A), a distance can be calculated based on the received position data and position data of the game device and whether a distance is small or great can be determined based on whether a distance is equal to or greater than a threshold value.

In addition, as the display processing in FIG. 22 (B), by referring to position history data which will be described later, determination as either approaching or moving away can be made based on change in distance based on the received position data and position data of the game device.

Moreover, as the display processing in FIG. 22 (C), by referring to position history data which will be described later, in which direction movement is being made can be determined based on change in a trace of positions (a position vector) based on the received position data and position data received next.

FIG. 26 is a diagram illustrating position history data of received position data based on the present second embodiment.

Referring to FIG. 26, position data at each time of reception is shown. In the present example, a position P, a position Q, and a position R in accordance with the time of reception are shown as examples.

The display processing in FIG. 22 can be performed based on change in position P, Q, and R.

Though a case that the display processing is performed by receiving position data of another game device registered in the friend registration list through communication with that game device is described in the present example, limitation to that case is not particularly intended or limitation to another game device registered in the friend registration list is not particularly intended, and similar processing can also be performed also for another game device of which position data can be received.

Though the case that the same application ID 332 is possessed, that is, predetermined information processing is performed based on received position data by transmitting and receiving position data included in communication data of the same game, has been described in the embodiment above, position data of another game device should only be received, and even though the same application ID 332 is not possessed, position data included in communication data corresponding to another application may be obtained and made use of.

Third Embodiment

In the present third embodiment, a case that predetermined information processing is performed by exchanging position data between a plurality of (two or more) other game devices and a certain game device will be described.

Figure 27:
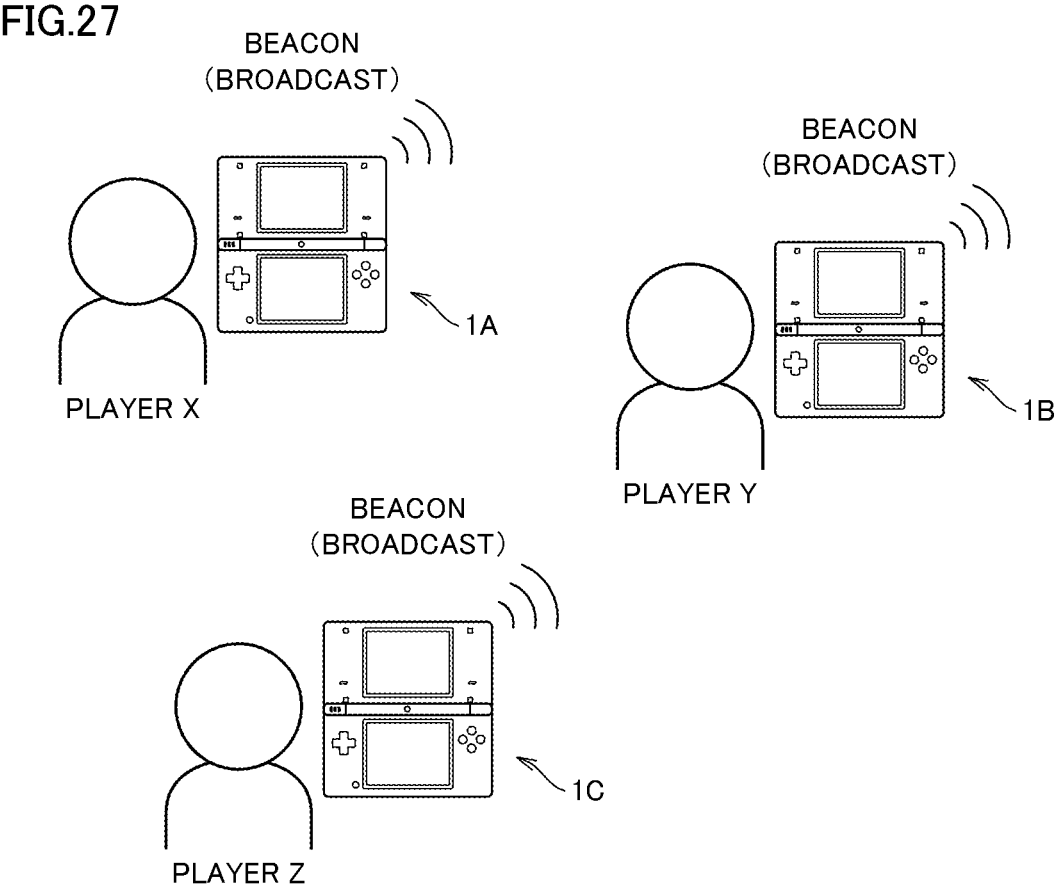
FIG. 27 shows an exemplary illustrative non-limiting diagram schematically illustrating a configuration of an information processing system according to a third exemplary embodiment.

FIG. 27 is a diagram schematically illustrating a configuration of an information processing system based on the present third embodiment.

Referring to FIG. 27, here, a case that a certain game device and a plurality of (two or more) other game devices are provided is shown. Specifically, a case that game devices 1A to 1C are shown and players X, Y, and Z possess game devices 1A to 1C, respectively, is shown.

Each of game devices 1A to 1C has a wireless communication function and is provided to be able to broadcast a beacon.

Figure 28:
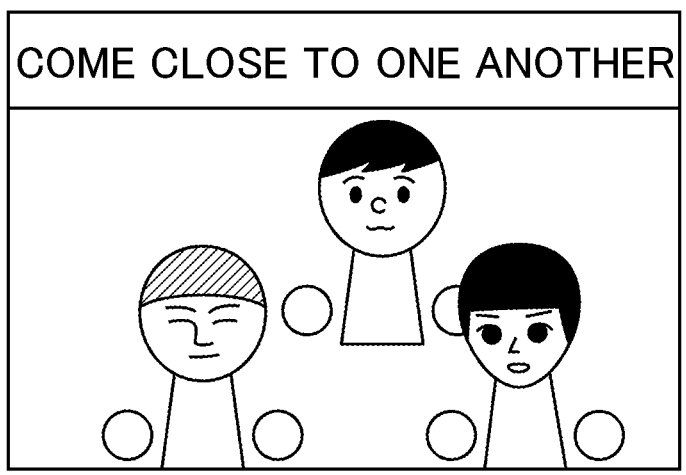
FIG. 28 shows an exemplary illustrative non-limiting diagram illustrating a specific example of predetermined information processing according to the third exemplary embodiment.

FIG. 28 is a diagram illustrating a specific example of predetermined information processing based on the third embodiment.

Referring to FIG. 28, here, a case that three characters are displayed on a screen and a message "come close to one another" is displayed is shown. Each character is displayed in correspondence with each of game devices 1A to 1C and display processing is performed based on position data exchanged with one another.

In the present third embodiment, game processing is performed based on exchanged position data. Namely, a case that processing for starting game processing is performed with a small distance being defined as an execution condition for starting game processing, by using position data, will be described.

Figure 29:
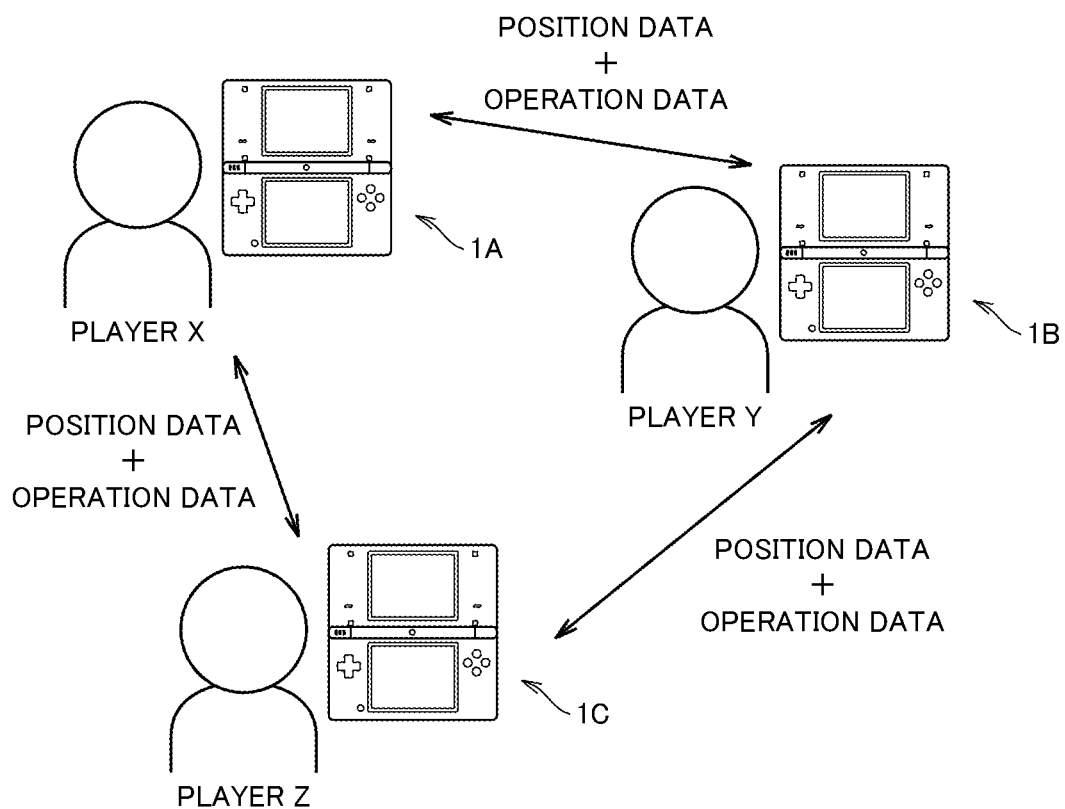
FIG. 29 shows an exemplary illustrative non-limiting diagram illustrating data communication in the information processing system according to the third exemplary embodiment.

FIG. 29 is a diagram illustrating data communication in the information processing system in the present third embodiment.

Referring to FIG. 29, here, data transmission and reception among game devices 1A to 1C is carried out in each game device.

Specifically, the game devices exchange position data and operation data with one another. Then, predetermined information processing based on the position data and the operation data exchanged among the game devices is performed.

The operation data (input data) is data indicating input from a user to input device 11.

In the present example, a case that position data is made use of as an execution condition while game processing is performed by a plurality of (two or more) players will be described. Specifically, it is assumed that game processing can be performed by a plurality of persons when position data is exchanged with one another and a distance based on the exchanged position data is within a predetermined distance.

Then, it is assumed that, as the game processing, by way of example, a match game can be played by using user characters possessed by respective game devices 1A to 1C. Specifically, it is assumed that a match game (by way of example, a fighting game, a board game, or the like) is played through predetermined processing in accordance with operation data, based on the operation data transmitted together with position data from each game device.

Figure 30:
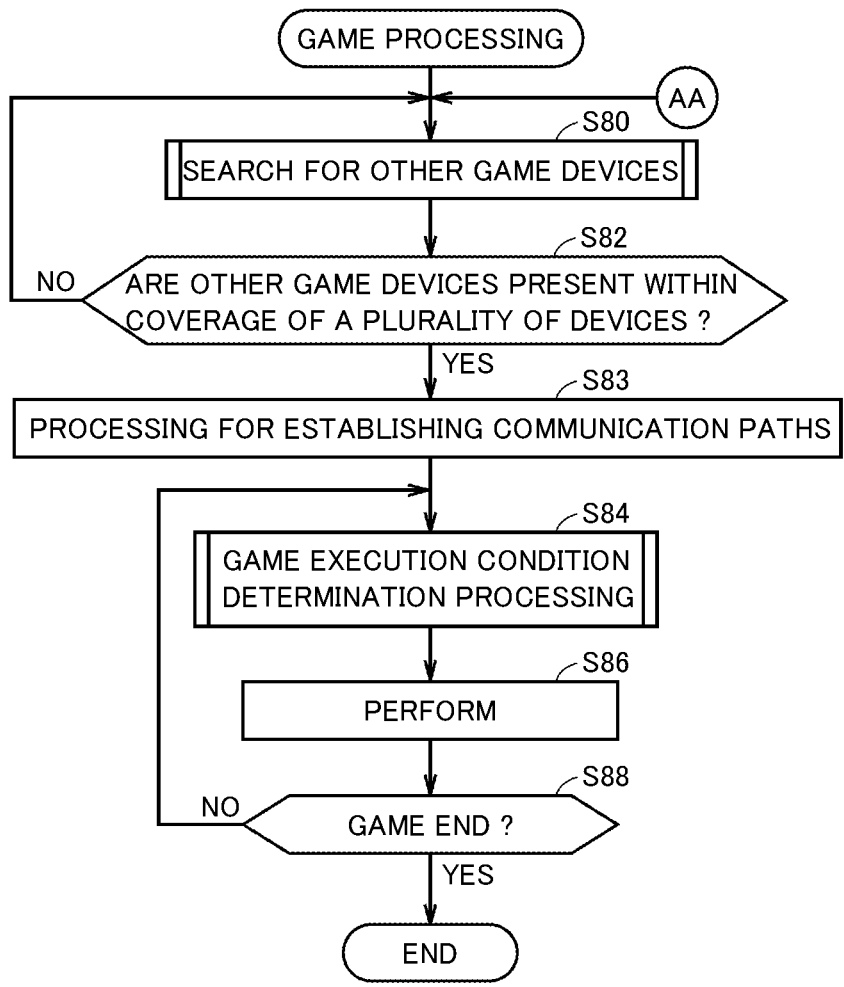
FIG. 30 shows an exemplary illustrative non-limiting flowchart illustrating game processing according to the third exemplary embodiment.

FIG. 30 is a flowchart illustrating game processing based on the present third embodiment.

Referring to FIG. 30, the game processing is performed by processor 13 of game device 1. Specifically, it is performed as processor 13, wireless communication device 16, and the like of game device 1 cooperate. Specifically, it is performed as processor 13 executes application program 304B and cooperates with wireless communication device 16.

Initially, processing for searching for other game devices 1 is performed (step S80). This is performed, for example, as each game device 1 repeats processing for transmitting a beacon indicating a connection request and processing for receiving this beacon.

Then, as a result of search, whether or not a plurality of other game devices 1 are present within coverage is determined (step S82). For example, when response signals to the transmitted beacon are received from a plurality of (two or more) other predetermined game devices 1 within a predetermined time period or when the beacons from other predetermined game devices 1 are received, affirmative determination is made.

When it is determined in step S82 that a plurality of other information processing apparatuses are present within coverage (YES in step S82), processing for establishing communication paths for carrying out communication with other information processing apparatuses is performed (step S83).

On the other hand, when it is determined that a plurality of other information processing apparatuses are not present within coverage (NO in step S82), the process returns to step S80 and the search processing is continued.

Then, when communication paths are established in step S83, game execution condition determination processing is then performed (step S84). Details of the game execution condition determination processing will be described later.

Then, the game processing is performed (step S86).

Then, whether or not the game has ended is determined (step S88).

When it is determined in step S88 that the game has not ended (NO in step S88), the process returns to step S84 and the game execution condition determination processing is again performed.

On the other hand, when the game has ended, the process ends (end).

Figure 31:
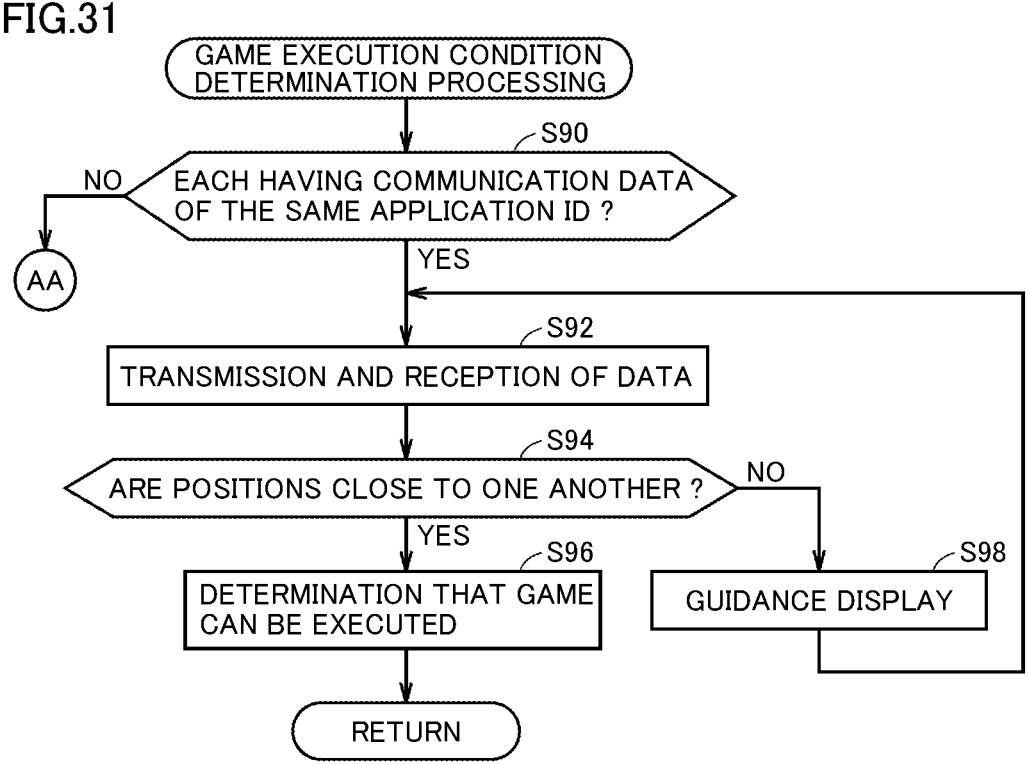
FIG. 31 shows an exemplary illustrative non-limiting flowchart illustrating details of game execution condition determination processing according to the third exemplary embodiment.

FIG. 31 is a flowchart illustrating details of the game execution condition determination processing based on the third embodiment.

Referring to FIG. 31, application ID 332 is transmitted and received, and whether or not each has the same application ID 332 is determined (step S90). Namely, whether or not the plurality of other information processing apparatuses prepare communication data for the same game is determined.

When it is determined in step S90 that the plurality of other information processing apparatuses have the same application ID 332 (YES in step S90), processing for transmitting transmission data 333 and processing for receiving and storing data sent from other game devices as reception data 335 are performed (step S92).

Then, whether or not positions are close to one another is determined based on position data (step S94). Namely, whether or not a distance from one another based on the position data is within a predetermined range is determined.

When determination as being close to one another is made in step S94 (YES in step S94), it is determined that a game can be executed (step S96).

Then, the process ends (return). Thus, the game processing is performed. Namely, game processing for exchanging operation data obtained by operation in each game device is performed.

On the other hand, when determination as not being close to one another is made in step S94 (NO in step S94), guidance display is provided (step S98).

Specifically, as described with reference to FIG. 28, a message "come close to one another" is displayed.

Then, the process again returns to step S92, where position data is exchanged with other game devices, and the processing is repeated.

When it is determined in step S90 that each does not have the same application ID 332 (NO in step S90), the process proceeds to "AA" because search for other game devices should be carried out. Namely, the process returns to step S80, where the processing is repeated.

Through the processing, in starting game processing, when position data is received and it indicates being close to one another in positional relation between a plurality of other game devices and the game device, game processing can be performed.

In addition, the game execution condition determination processing is repeated also during game processing until the game ends. Then, if a distance becomes greater in the game execution condition determination processing during game processing, guidance display described with reference to FIG. 28 is again output, so that it can be requested that positional relation satisfy a predetermined condition even during game processing.

With such a scheme, since users (players) who perform game processing perform game processing at a small distance from one another (within a predetermined distance), togetherness and a sense of reality of game processing can be enjoyed and zest of data communication can be enhanced.

Other Embodiments

Figure 32:
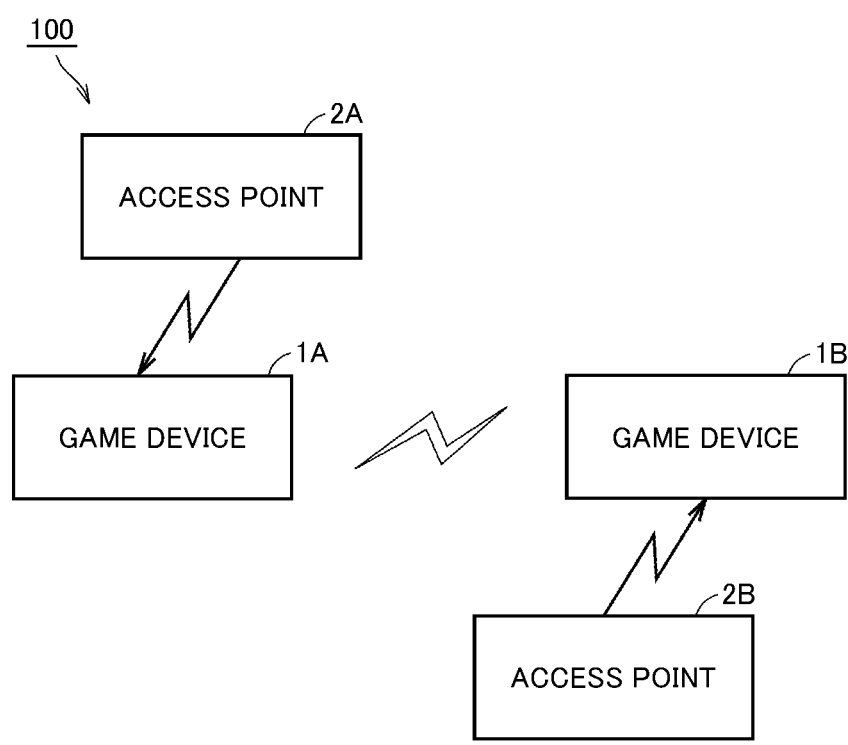
FIG. 32 shows an exemplary illustrative non-limiting diagram illustrating a configuration of an information processing system according to another exemplary embodiment.

FIG. 32 is a diagram illustrating a configuration of an information processing system based on another embodiment.

Referring to FIG. 32, the information processing system based on another embodiment has a plurality of game devices and a plurality of access points.

Though the case that GPS is made use of as position data obtaining device 17 has been described in the embodiments above, limitation to GPS is not particularly intended, and position data can also be obtained based on other schemes.

In the present example, a case that game devices 1A, 1B having a wireless communication function and access points 2A, 2B capable of carrying out wireless communication with the game devices are provided is shown by way of example. A case that game device 1A carries out wireless communication with access point 2A and game device 1B carries out wireless communication with access point 2B is shown.

In the present information processing system, access points 2A, 2B provide position data to game devices 1A, 1B, respectively. This position data is information indicating a position where access point 2A, 2B is set, and it is made use of as information indicating a general current position of game device 1A, 1B. Position data includes, for example, information indicating latitude and longitude of access point 2A, 2B, information indicating an address of access point 2A, 2B, image data of a map around a position of access point 2, and the like, however, limitation to those listed is not intended and any information indicating a position of an access point may be applicable.

Game devices 1A, 1B receive position data from access points 2A, 2B within coverage, respectively, and obtain this data as data indicating a current position of each game device 1A, 1B.

Then, game devices 1A, 1B transmit and receive position data obtained from respective access points 2A, 2B to and from each other as position data of each device.

Thus, without providing position data obtaining device 17 using the GPS within the game device, position data can externally be obtained and the position data can be made use of so as to exchange position data of each device between game device 1A and game device 1B as described above.

Though the case that access points 2A, 2B carry out wireless communication with game devices 1A, 1B, respectively, is described in the present example, limitation thereto is not particularly intended, and a plurality of access points can also further be provided and position data of a game device can also be obtained based on relation between the plurality of access points and on intensity of radio waves.

In the present example, it is assumed that position data is obtained from an adjacent access point by way of example. It is noted that, in a case that position data from a plurality of adjacent access points is received, for example, position data from an access point high in intensity of radio waves can be prioritized by way of example.

It is noted that game device 1 in the present example may obtain position data by making use of acoustic waves without being limited to radio waves. Alternatively, position data can also be obtained by using an acceleration sensor provided within game device 1 and estimating position data of the device itself.

In addition, though a plurality of processes are performed by a single information processing apparatus (game device 1) in the embodiment above, in other embodiments, the plurality of these processes may be performed by a plurality of information processing apparatuses (for example, game device 1 and a server apparatus) as distributed.

For example, in the third embodiment, the plurality of processes shown in FIG. 30 may be performed by a single computer (processor 13) or may be performed by a plurality of computers making use of a server apparatus as distributed.

Figure 33:
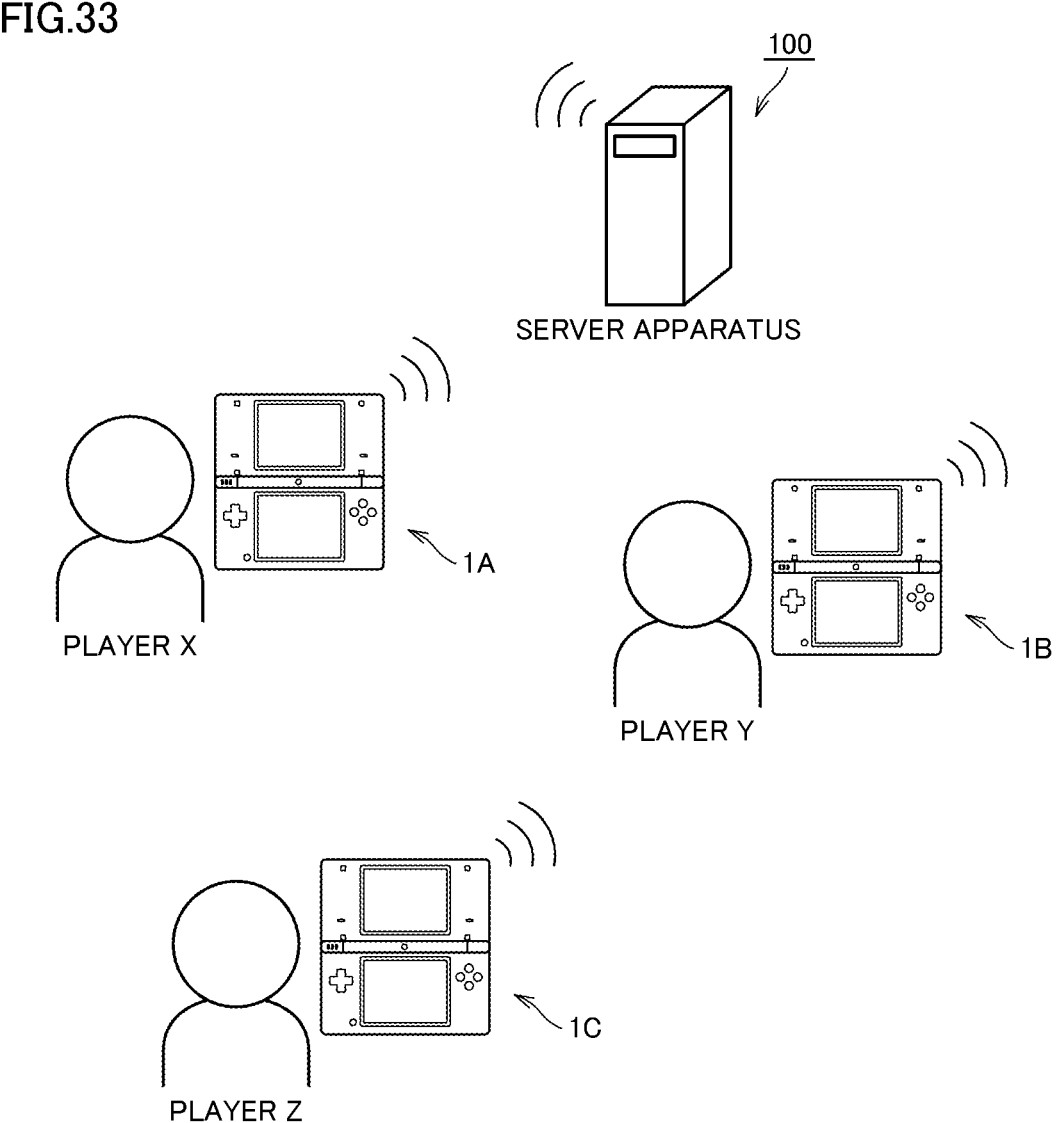
FIG. 33 shows an exemplary illustrative non-limiting diagram illustrating a configuration of another information processing system according to another exemplary embodiment.

FIG. 33 is a diagram illustrating a configuration of another information processing system based on another embodiment.

Referring to FIG. 33, another information processing system based on another embodiment has a plurality of game devices 1A to 1C and a server apparatus 100. It is assumed that each of game devices 1A to 1C is provided to be able to communicate with server apparatus 100.

Then, in the configuration, by way of example, in the game execution condition determination processing in step S84 in FIG. 30, server apparatus 100 may perform processing, results thereof may be transmitted to each game device, and each game device may perform game processing. Through the processing, for example, server apparatus 100 or the like is caused to perform processing heavy in processing load so that processing is distributed, and high-speed information processing can thus be realized.

It is noted that information processing making use of a server apparatus can also be performed similarly also in other first and second embodiments described above.

An application executable by a personal computer may be provided as a program in the present embodiment. Here, the program according to the present embodiment may be incorporated as a partial function (or module) of various applications executed on the personal computer.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory storage medium comprising a computer readable information processing program executable by a computer of a portable information processing apparatus having a wireless communication function, said information processing program causing said computer to:
   repeatedly obtain position data indicating a position of said portable information processing apparatus;
   transmit the repeatedly obtained position data to another portable information processing apparatus within coverage through wireless communication and receive position data repeatedly obtained by another portable information processing apparatus through said wireless communication; and
   perform information processing that includes, at least, generating a display of at least one display object configured to output at least a message displaying position information, indicating at least a distance and a direction of passing between information processing apparatuses, based on the position data received from said another portable information processing apparatus.

2. The non-transitory storage medium according to claim 1, wherein
   said information processing is performed based on the position data received from said another portable information processing apparatus and the position data indicating the position of said portable information processing apparatus.

3. The non-transitory storage medium according to claim 2, wherein
   said information processing is performed based on the position data received from said another portable information processing apparatus and the obtained position data indicating the position of said portable information processing apparatus when the position data has been received or when the information processing is performed.

4. The non-transitory storage medium according to claim 2, wherein
said information processing is performed based on relative positional relation between a position of another portable information processing apparatus and the position of said portable information processing apparatus, which is based on the position data received from said another portable information processing apparatus and the position data indicating the position of said portable information processing apparatus.

5. The non-transitory storage medium according to claim 4, wherein
said information processing is performed based on at least one of a distance and a direction obtained from the position data indicating the position of said portable information processing apparatus and the position data received from said another portable information processing apparatus.

6. The non-transitory storage medium according to claim 1, wherein
said information processing is repeatedly performed based on the position data repeatedly received from said another portable information processing apparatus.

7. The non-transitory storage medium according to claim 6, wherein
said information processing is performed based on change in said position data received from said another portable information processing apparatus.

8. The non-transitory storage medium according to claim 7, wherein
said information processing is performed based on a trace of said position data received from said another portable information processing apparatus.

9. The non-transitory storage medium according to claim 1, wherein
said portable information processing apparatus transmits through wireless communication, data which can be made use of in information processing in said another portable information processing apparatus and the obtained position data to another portable information processing apparatus within coverage, and receives through said wireless communication from another portable information processing apparatus, data which can be made use of in information processing by said portable information processing apparatus and the position data obtained by another portable information processing apparatus, and
said information processing is performed based on said data which can be made use of and said position data received from said another portable information processing apparatus.

10. The non-transitory storage medium according to claim 9, wherein
said information processing is performed based on data of said portable information processing apparatus as well as on said data which can be made use of and said position data received from said another portable information processing apparatus.

11. The non-transitory storage medium according to claim 1, wherein
said portable information processing apparatus transmits through wireless communication, the obtained position data to a plurality of other portable information processing apparatuses within coverage, and receives position data obtained by the plurality of other portable information processing apparatuses through said wireless communication, and
said information processing is performed based on the position data received from said plurality of other portable information processing apparatuses.

12. The non-transitory storage medium according to claim 1, wherein
said information processing is performed based on input data indicating input from a user to an input device of said portable information processing apparatus and the position data received from said another portable information processing apparatus.

13. The non-transitory storage medium according to claim 1, wherein
input data which can be made use of with said another portable information processing apparatus is exchanged based on the position data received from said another portable information processing apparatus.

14. The non-transitory storage medium according to claim 1, wherein said information processing program further causing said computer to:
repeatedly search for another unspecified portable information processing apparatus within said coverage and automatically establish wireless connection; and
automatically transmit through wireless communication, said position data to said another portable information processing apparatus with which wireless connection has been established and automatically receive through said wireless communication, the position data obtained by the another portable information processing apparatus.

15. A method of controlling a portable information processing apparatus having a wireless communication function, the method comprising:
repeatedly obtaining position data indicating a position of said portable information processing apparatus;
transmitting the repeatedly obtained position data to another portable information processing apparatus within coverage through wireless communication;
receiving position data repeatedly obtained by said another portable information processing apparatus from another portable information processing apparatus through said wireless communication; and
performing information processing that includes, at least, generating a display of at least one display object configured to output at least a message displaying position information, indicating at least a distance and a direction of passing between information processing apparatuses, based on the position data received from said another portable information processing apparatus.

16. A portable information processing apparatus comprising at least one processor, the portable information processing apparatus configured to:
repeatedly obtain position data indicating a position of the portable information processing apparatus;
transmit the repeatedly obtained position data to another portable information processing apparatus within coverage through wireless communication and receive position data repeatedly obtained by another portable information processing apparatus through said wireless communication; and
perform information processing that includes, at least, generating a display of at least one display object configured to output at least a message displaying position information, indicating at least a distance and a direction of passing between information processing apparatuses, based on the position data received from said another portable information processing apparatus.

17. An information processing system, comprising:
a processing system having at least one processor, the processing system configured to:
   repeatedly obtain position data indicating a position of a portable information processing apparatus;
   transmit the repeatedly obtained position data to another portable information processing apparatus within coverage through wireless communication and receive position data repeatedly obtained by another portable information processing apparatus through said wireless communication; and
   perform information processing that includes, at least, generating a display of at least one display object configured to output at least a message displaying position information, indicating at least a distance and a direction of passing between information processing apparatuses, based on the position data received from said another portable information processing apparatus.

18. A portable information processing apparatus comprising at least one processor, the portable information processing apparatus configured to:
   obtain position data indicating a position of the portable information processing apparatus;
   transmit the obtained position data and character data, which can be made use of in information processing in another portable information processing apparatus, to said another portable information processing apparatus within coverage through wireless communication;
   receive position data obtained by another portable information processing apparatus and character data, which can be made use of in information processing by said portable information processing apparatus, through said wireless communication; and
   perform information processing that includes, at least, generating a display of at least one display object configured to output information, indicating at least a distance and a direction of passing between information processing apparatuses, based on the position data received from said another portable information processing apparatus and said character data.

19. A portable information processing apparatus comprising at least one processor, the portable information processing apparatus configured to:
   obtain position data indicating a position of the portable information processing apparatus;
   transmit the obtained position data to a plurality of other portable information processing apparatus within coverage through wireless communication and receive position data obtained by the plurality of other portable information processing apparatus through said wireless communication; and
   perform information processing that includes, at least, generating a display of at least one display object configured to output at least a message displaying position information, indicating at least a distance and a direction of passing between information processing apparatuses, based on the position data received from said plurality of other portable information processing apparatus.

20. The non-transitory storage medium according to claim 1, wherein the at least one display object corresponds to a virtual character that is configured to output the message displaying position information based on the position data received from said another portable information processing apparatus.

21. The non-transitory storage medium according to claim 1, wherein the position data is a position of a region where a number of passing between information processing apparatuses has occurred.

22. The non-transitory storage medium according to claim 1, wherein the position data is used to update a parameter in a game process.

* * * * *